United States Patent
Wood

[19]

[11] Patent Number: 5,908,478
[45] Date of Patent: Jun. 1, 1999

[54] METHOD FOR MAKING ABRASIVE GRAIN USING IMPREGNATION, AND ABRASIVE ARTICLES

[75] Inventor: William P. Wood, Golden Valley, Minn.

[73] Assignee: Minnesota Mining & Manufacturing Company, St. Paul, Minn.

[21] Appl. No.: 09/109,446

[22] Filed: Jul. 2, 1998

Related U.S. Application Data

[62] Division of application No. 08/781,558, Jan. 9, 1997, Pat. No. 5,824,124.

[51] Int. Cl.$^6$ ..................................................... C09C 1/68
[52] U.S. Cl. ............................................. 51/309; 51/295
[58] Field of Search ............................. 51/293, 295, 309

[56] References Cited

U.S. PATENT DOCUMENTS

| | | | |
|---|---|---|---|
| 4,202,870 | 5/1980 | Weber et al. | 423/630 |
| 4,314,827 | 2/1982 | Leitheiser et al. | 51/298 |
| 4,518,397 | 5/1985 | Leitheiser et al. | 51/293 |
| 4,574,003 | 3/1986 | Gerk | 51/309 |
| 4,623,364 | 11/1986 | Conttringer et al. | 51/309 |
| 4,676,928 | 6/1987 | Leach et al. | 252/313.1 |
| 4,744,802 | 5/1988 | Schwabel | 51/309 |
| 4,770,671 | 9/1988 | Monroe et al. | 51/293 |
| 4,799,938 | 1/1989 | Janz et al. | 51/293 |
| 4,848,041 | 7/1989 | Kruschke | 51/309 |
| 4,881,951 | 11/1989 | Wood et al. | 51/309 |
| 4,954,462 | 9/1990 | Wood et al. | 501/95 |
| 4,964,883 | 10/1990 | Morris et al. | 51/293 |
| 4,988,370 | 1/1991 | Haynes, Jr. | 51/309 |
| 4,997,461 | 3/1991 | Markhoff-Matheny et al. | 51/295 |
| 5,009,676 | 4/1991 | Rue et al. | 51/309 |
| 5,011,508 | 4/1991 | Wald et al. | 51/293 |
| 5,035,723 | 7/1991 | Kalinowski et al. | 51/309 |
| 5,090,968 | 2/1992 | Pellow | 51/293 |
| 5,094,672 | 3/1992 | Giles, Jr. et al. | 51/309 |
| 5,139,978 | 8/1992 | Wood | 501/127 |
| 5,152,917 | 10/1992 | Pieper et al. | 51/295 |
| 5,160,509 | 11/1992 | Carman et al. | 51/307 |
| 5,164,348 | 11/1992 | Wood | 501/127 |
| 5,185,299 | 2/1993 | Wood et al. | 501/95 |
| 5,201,916 | 4/1993 | Berg et al. | 51/293 |
| 5,213,591 | 5/1993 | Celikkaya et al. | 51/293 |
| 5,219,806 | 6/1993 | Wood | 501/127 |
| 5,227,104 | 7/1993 | Bauer | 264/56 |
| 5,304,331 | 4/1994 | Leonard et al. | 264/141 |
| 5,366,523 | 11/1994 | Rowenhorst et al. | 51/293 |
| 5,372,620 | 12/1994 | Rowse et al. | 51/309 |
| 5,429,647 | 7/1995 | Larmie | 51/295 |
| 5,431,705 | 7/1995 | Wood | 51/309 |
| 5,435,816 | 7/1995 | Spurgeon et al. | 51/295 |
| 5,489,204 | 2/1996 | Conwell et al. | 432/153 |
| 5,498,269 | 3/1996 | Larmie | 51/295 |
| 5,500,273 | 3/1996 | Holmes et al. | 428/147 |
| 5,516,348 | 5/1996 | Conwell et al. | 51/309 |
| 5,527,369 | 6/1996 | Garg | 51/309 |
| 5,547,479 | 8/1996 | Conwell et al. | 51/309 |
| 5,551,963 | 9/1996 | Larmie | 51/307 |
| 5,593,467 | 1/1997 | Monroe | 51/309 |
| 5,611,829 | 3/1997 | Monroe et al. | 51/309 |
| 5,645,619 | 7/1997 | Erickson et al. | 51/309 |
| 5,653,775 | 8/1997 | Plovnick | 51/309 |
| 5,672,097 | 9/1997 | Hoopman | 451/526 |
| 5,728,184 | 3/1998 | Monroe | 51/309 |

FOREIGN PATENT DOCUMENTS

WO 96/32226   10/1996   WIPO .

OTHER PUBLICATIONS

D. Brewis et al., "Reduction In Contact Adhesion", *J. of Adhesion*, vol. 26, 1988, pp. 230–233.

Magnesium Elektron brochure, "An Introduction to Zirconium–Polymer Interactions", 2 pages, Nov. 7, 1996.

*Primary Examiner*—Deborah Jones
*Attorney, Agent, or Firm*—Gregory D. Allen

[57] ABSTRACT

Method for making alpha alumina-based abrasive grain from a dispersion comprising boehmite, wherein the method involves the impregnation of an alpha alumina-based ceramic precursor material. The abrasive grain can be incorporated into abrasive products such as coated abrasives, bonded abrasives, and non-woven abrasives.

60 Claims, 3 Drawing Sheets

METHOD FOR MAKING ABRASIVE GRAIN USING IMPREGNATION, AND ABRASIVE ARTICLES

This is a divisional of application having Ser. No. 08/781,558, filed Jan. 9, 1997, now U.S. Pat. No. 5,824,124.

FIELD OF THE INVENTION

The present invention relates to a method for making alpha alumna-based abrasive grain from a dispersion comprising boehmite. The abrasive grain can be incorporated into abrasive products such as coated abrasives, bonded abrasives, and non-woven abrasives.

DESCRIPTION OF RELATED ART

Fused alumina abrasive grain have been utilized in abrasive applications for close to one hundred years. Such abrasive grain are made by heating an alumina source above its melting point, quenching, and then crushing to form alumina abrasive grain or particles.

In the early 1980's a new and substantially improved type of alumina abrasive grain, commonly referred to as "sol gel" or "sol gel-derived" abrasive grain, was commercialized. In general, sol gel abrasive grain are typically made by preparing a dispersion or sol comprising water and alumina monohydrate (boehmite), gelling the dispersion, drying the gelled dispersion, crushing the dried dispersion into particles, calcining the particles to remove volatiles, and sintering the calcined particles at a temperature below the melting point of alumina. Frequently, the dispersion also includes one or more oxide modifiers, nucleating agents, and/or precursor thereof. In addition, there are some teachings wherein dried and/or calcined particles are impregnated with one or more oxide modifiers, nucleating agents, and/or precursors thereof. Further details regarding sol gel abrasive grain, including methods for making them, can be found, for example, in U.S. Pat. Nos. 4,314,827 (Leitheiser et al.), 4,518,397 (Leitheiser et al.), 4,623,364 (Cottringer et al.), 4,744,802 (Schwabel), 4,770,671 (Monroe et al.), 4,881,951 (Wood et al.), 5,011,508 (Wald et al.), 5,090,968 (Pellow), 5,139,978 (Wood), 5,201,916 (Berg et al.), 5,227,104 (Bauer), 5,366,523 (Rowenhorst et al.), 5,429,647 (Larmie), 5,498,269 (Larmie), and 5,551,963 (Larmie).

In general, the viscosity of a boehmite dispersion or sol increases as its solids content increases. Further, the addition of metal oxide precursors such as metal nitrates, acetates, citrates, formates, and/or chlorides tends to increase the viscosity of the dispersion even beyond their effect on the solids content of the dispersion. Such increases in viscosity tend to increase, for example, the difficulty in providing a homogeneous mixture of components in the dispersions (also see, e.g., col. 1, line 13 to col. 2, line 8 of U.S. Pat. No. 5,227,104 (Bauer)).

Further with regard to the '104 patent, the disclosure of which is incorporated herein by reference, Bauer teaches extruding a gelled boehmite dispersion having a solids content greater than 30% by weight (preferably, between 45% and 75%) to form, after drying, calcining, and sintering, abrasive particles. Bauer also teaches that the addition of extremely fine $Al_2O_3$ seeds will allow the gel to sinter to greater than 90% theoretical density in only a few minutes without the presence of MgO as a sintering aid/grain growth inhibitor. The sintered material is said to have a submicron microstructure. Such a "seeded" ceramic abrasive material is said to perform much better than the MgO containing "unseeded" gel in many grinding applications. It is also said in the '104 patent that the MgO may still be added to the "seeded" gel but does not generally improve the performance any further and is often deleterious. Further, Bauer states that by eliminating magnesium salt additions, he has effectively removed the reason he provides at col. 1, lines 16–35 for "high water" requirements for the gel, and thereby allows the solids content to be increased by a factor of 2–3 (see col. 2, lines 22–44; also see col. 2, lines 9–18).

Other methods for making sol gel alpha alumina-based abrasive grain utilize an impregnation step wherein the dried or calcined material (i.e., ceramic precursor material) is impregnated with a composition that includes metal oxide, metal oxide precursor, and/or combinations thereof, and a liquid medium, to provide an impregnated abrasive grain precursor. After the impregnation step, the impregnated ceramic precursor material is typically dried and then calcined (generally, this is a second calcining step) to form an impregnated, calcined ceramic precursor material, which is in turn sintered (see, e.g., U.S. Pat. Nos. 5,139,978 (Wood), 5,164,348 (Wood), 5,213,591 (Celikkaya et al.) and 5,011,508 (Wald et al.)).

In another aspect, a common optional step in conventional sol gel processes for making abrasive grain is crushing the dried gel (see, e.g., U.S. Pat. Nos. 4,314,827 (Leitheiser et al.), 4,518,397 (Leitheiser et al.), 4,744,802 (Schwabel), 4,881,951 (Wood et al.), and 5,139,978 (Wood)). Typically, the crushed material does not provide a single grade, or size range, of dried particles, but rather a large distribution of particle sizes. Particles less than about 60 micrometers in size are commonly referred to as "fines". In some instances, these fines are too small to be economically further processed into sintered abrasive particles using the same techniques (typically rotary calcining and sintering) used to further process the larger sized dried particles (see, e.g., U.S. Pat. No. 5,489,204 (Conwell et al.)). In many instances, these fines are sent to landfills or stored until a use for them can be found.

In an effort to eliminate the dried fines, attempts have been made to incorporate them back into the sol gel process (i.e., to recycle them into new dried particles, and ultimately into sintered abrasive grain). For example, U.S. Pat. No. 4,314,827 (Leitheiser et al.), the disclosure of which is incorporated herein by reference, teaches redispersing the fines in a sol or dispersion. A drop in abrading performance and other properties (e.g., density and hardness), however is experienced when too many fines are recycled. Further, in general, recycled material from sols or dispersions containing alpha alumina seeds typically exhibits a significantly lower percent decrease in abrading performance than does recycled material from sols or dispersions free of alpha alumina or alpha ferric oxide seeds. One need in the art is a process wherein such recycled material can be used to make abrasive grain having good abrading performance characteristics.

SUMMARY OF THE INVENTION

In general, the present invention provides a method for making alpha alumina-based ceramic abrasive grain, the method comprising the steps of:

(a) converting a dispersion comprising a mixture comprising a first liquid medium (preferably, water), a peptizing agent (typically an acid), and greater than 35 percent by weight boehmite, based on the total weight of the dispersion, to an alpha alumina-based precursor material; the dispersion being preparable by (and typically prepared by) combining components comprising the first liquid medium, the peptizing agent, and the boehmite;

(b) impregnating the precursor material with an impregnating composition comprising a mixture comprising a second liquid medium (preferably, water) and impregnating material; and (c) converting the impregnated precursor material to alpha alumina-based ceramic abrasive grain.

Certain dispersions used in a method(s) according to the present invention contain, on a theoretical metal oxide basis, less than 0.05 percent by weight of alpha alumina seeds or nucleating agent or nucleating material, based on the total theoretical metal oxide content of the dispersion, wherein it is understood that "less than 0.05 percent by weight of alpha alumina seeds or nucleating agent or nucleating material" includes zero percent by weight alpha alumina seeds, nucleating agent, or nucleating material, respectively.

One method according to the present invention for making alpha alumina-based ceramic abrasive grain comprises the steps of:

(a) converting a dispersion comprising a mixture comprising a first liquid medium (preferably, water), a peptizing agent (typically an acid), and greater than 35 percent (preferably, at least 60 percent) by weight boehmite, based on the total weight of the dispersion, wherein the dispersion contains, on a theoretical metal oxide basis, less than 0.05 percent by weight of alpha alumina seeds, based on the total theoretical metal oxide content of the dispersion, to alpha alumina-based ceramic precursor material;

(b) impregnating the precursor material with an impregnating composition comprising a mixture comprising a second liquid medium (preferably, water) and impregnating material; and (c) converting the impregnated precursor material to alpha alumina-based ceramic abrasive grain.

Certain dispersions used in this method contain, on a theoretical metal oxide basis, less than 0.05 percent by weight of nucleating agent or nucleating material, based on the total theoretical metal oxide content of the dispersion.

Another method according to the present invention for making alpha alumina-based ceramic abrasive grain comprises the steps of:

(a) converting a dispersion comprising a mixture comprising a first liquid medium (preferably, water), a peptizing agent (typically an acid), and greater than 35 percent (preferably, at least 60 percent) by weight boehmite, based on the total weight of the dispersion, to alpha alumina-based ceramic precursor material, the boehmite being present in an amount sufficient to provide, on a theoretical oxide basis, the dispersion with greater than 99.9 percent (or even greater than 99.95 percent) by weight $Al_2O_3$, based on the total theoretical metal oxide content of the dispersion;

(b) impregnating the precursor material with an impregnating composition comprising a mixture comprising a second liquid medium (preferably, water) and impregnating material; and (c) converting the impregnated precursor material to alpha alumina-based ceramic abrasive grain.

Certain dispersions used in this method contain, on a theoretical metal oxide basis, less than 0.05 percent by weight of alpha alumina seeds or nucleating agent or nucleating material, based on the total theoretical metal oxide content of the dispersion.

Another method according to the present invention for making alpha alumina-based ceramic abrasive grain comprises the steps of:

(a) converting a dispersion comprising a mixture comprising a first liquid medium (preferably, water), a peptizing agent (typically an acid), at least one of a first metal oxide or precursor thereof, and greater than 35 percent (preferably, at least 60 percent) by weight boehmite, based on the total weight of the dispersion, to alpha alumina-based ceramic precursor material;

(b) impregnating the precursor material with an impregnating composition comprising a mixture comprising a second liquid medium (preferably, water) and at least one of a second metal oxide or precursor thereof; and (c) converting the impregnated precursor material to alpha alumina-based ceramic abrasive grain, wherein the at least one of a first metal oxide or precursor thereof and said at least one of a second metal oxide or precursor thereof are present in a sufficient amount to provide the abrasive grain with, on a theoretical metal oxide basis, at least 0.1 percent by weight metal oxide, based on the total metal oxide content of the abrasive grain. Certain dispersions used in this method contain, on a theoretical metal oxide basis, less than 0.05 percent by weight of alpha alumina seeds or nucleating agent or nucleating material, based on the total theoretical metal oxide content of the dispersion.

Preferably, dispersions utilized in methods according to the present invention are compacted (preferably, at a pressure of at least $3.5\times10^4$ kg/m$^2$ (50 lb/in$^2$); more preferably, at least $1.05\times10^5$ kg/m$^2$ or even at least $1.4\times10^5$ kg/m$^2$) prior to converting it to alpha alumina-based ceramic precursor material. Compacting the dispersion typically increases the density and significantly increases the abrading performance of the resulting abrasive grain in one or more abrading applications, particularly when compacted at a pressure of at least $3.5\times10^4$ kg/m$^2$.

Certain preferred impregnated precursor material utilized in the method according to the present invention comprise, on a theoretical metal oxide basis, at least 0.1 percent, greater than 0.5 percent, or even greater than 2 percent, by weight metal oxide (other than alumina), based on the total theoretical oxide content of the abrasive grain. In another aspect, certain preferred impregnated precursor material utilized in the method according to the present invention comprise, on a theoretical oxide basis, at least 0.1 percent, at least 0.5 percent, or even at least about 2 percent (in some instances, preferably in the range from 0.1 percent to about 10 percent; or more preferably, in the range from about 0.5 percent to about 10 percent) by weight of metal oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, $SnO_2$, and ZnO, based on the total theoretical metal oxide content of the impregnated precursor material.

In one aspect, the present invention provides a method for making alpha alumina-based ceramic abrasive grain, the method comprising the steps of:

(a) preparing a first dispersion by combining components comprising liquid medium, acid, and boehmite;

(b) drying the first dispersion to provide first alpha alumina-based precursor material;

(c) combining components comprising water and the first alpha alumina-based precursor material to provide a second dispersion comprising water, a peptizing agent, and greater than 60 percent by weight boehmite, based on the total weight of the dispersion, the boehmite being present in an amount sufficient to provide, on an oxide basis, the dispersion with greater than 99.95 percent by weight Al$_2$O$_3$, based on the total metal oxide content of the dispersion, and the peptizing agent being at least one acid;

(d) converting the second dispersion to second alpha alumina-based ceramic precursor material, wherein step (d) includes (i) extruding the dispersion through a segmented screw extruder, and wherein extruding includes compacting the dispersion, (ii) drying the second dispersion, and (iii) calcining the dried dispersion;

(e) impregnating the second precursor material with a composition comprising a mixture comprising water and at least one of a metal oxide or precursor thereof; and (f) converting the impregnated precursor material to alpha alumina-based ceramic abrasive grain having a density of greater than 92 percent of theoretical, wherein the composition impregnated into the precursor material is sufficient to provide, on a metal oxide basis, greater than 0.1 percent metal oxide, based on the total metal oxide content of the abrasive grain.

In another aspect, the present invention provides a method for making alpha alumina-based ceramic abrasive grain, the method comprising the steps of:

(a) preparing a first dispersion by combining components comprising liquid medium, acid, and boehmite;

(b) drying the first dispersion to provide first alpha alumina-based precursor material;

(c) combining components comprising water, boehmite, and the first alpha alumina-based precursor material to provide a second dispersion comprising water, a peptizing agent, and greater than 60 percent by weight boehmite, based on the total weight of the dispersion, the boehmite being present in an amount sufficient to provide, on an oxide basis, the dispersion with greater than 99.95 percent by weight Al$_2$O$_3$, based on the total metal oxide content of the dispersion, and the peptizing agent being at least one acid;

(d) converting the second dispersion to second alpha alumina-based ceramic precursor material, wherein step (d) includes (i) extruding the dispersion through a segmented screw extruder, and wherein extruding includes compacting the dispersion, (ii) drying the second dispersion, and (iii) calcining the dried dispersion;

(e) impregnating the second precursor material with a composition comprising a mixture comprising water and at least one of a metal oxide or precursor thereof; and (f) converting the impregnated precursor material to alpha alumina-based ceramic abrasive grain having a density of greater than 92 percent of theoretical, wherein the composition impregnated into the precursor material is sufficient to provide, on a metal oxide basis, greater than 0.1 percent metal oxide, based on the total metal oxide content of the abrasive grain.

In another aspect, the present invention provides a method for making alpha alumina-based ceramic abrasive grain, the method comprising the steps of:

(a) providing a first dispersion by combining components comprising liquid medium, acid, and boehmite;

(b) drying the first dispersion to provide first alpha alumina-based precursor material;

(c) combining components comprising water and the first alpha alumina-based precursor material to provide a second dispersion comprising water, a peptizing agent, at least one of a first metal oxide or precursor thereof, and greater than 60 percent by weight boehmite, based on the total weight of the dispersion, the peptizing agent being at least one acid;

(d) converting the second dispersion to second alpha alumina-based ceramic precursor material, wherein step (d) includes (i) extruding the dispersion through a segmented screw extruder, and wherein extruding includes compacting the dispersion, (ii) drying the dispersion, and (iii) calcining the dried dispersion;

(e) impregnating the second precursor material with a composition comprising a mixture comprising a second liquid medium and at least one of a second metal oxide or precursor thereof; and (f) converting the impregnated precursor material to alpha alumina-based ceramic abrasive grain having a density of greater than 92 percent of theoretical, wherein the least one of a second metal oxide or precursor thereof is present in a sufficient amount to provide the abrasive grain with, on a metal oxide basis, at least 0.1 percent by weight metal oxide, based on the total metal oxide content of the abrasive grain.

In another aspect, the present invention provides a method for making alpha alumina-based ceramic abrasive grain, the method comprising the steps of:

(a) preparing a first dispersion by combining components comprising liquid medium, acid, and boehmite;

(b) drying the first dispersion to provide first alpha alumina-based precursor material;

(c) combining components comprising water, boehmite, and the first alpha alumina-based precursor material to provide a second dispersion comprising water, a peptizing agent, at least one of a first metal oxide or precursor thereof, and greater than 60 percent by weight boehmite, based on the total weight of the dispersion, the peptizing agent being at least one acid;

(d) converting the second dispersion to second alpha alumina-based ceramic precursor material, wherein step (d) includes (i) extruding the dispersion through a segmented screw extruder, and wherein extruding includes compacting the dispersion, (ii) drying the second dispersion, and (iii) calcining the dried dispersion;

(e) impregnating the second precursor material with a composition comprising a mixture comprising a second liquid medium and at least one of a second metal oxide or precursor thereof; and (f) converting the impregnated precursor material to alpha alumina-based ceramic abrasive grain having a density of greater than 92 percent of theoretical, wherein the least one of a second metal oxide or precursor thereof is present in a sufficient amount to provide the abrasive grain with, on a metal oxide basis, at least 0.1 percent by weight metal oxide, based on the total metal oxide content of the abrasive gram.

In this application:

"Boehmite" refers to alpha alumina monohydrate and boehmite commonly referred to in the art as "pseudo" boehmite (i.e., Al$_2$O$_3$.xH$_2$O, wherein x=1 to 2).

"Impregnating material" refers to metal oxide(s) and/or precursor(s) thereof.

"Converting" with regard to making the precursor material, refers to any step or series of steps that provide the precursor material, including deliquifying (typically drying), and may include crushing and/or calcining.

"Ceramic precursor material" or "unsintered ceramic material" refers to deliquified or dried alumina-based dispersion (i.e., deliquified or dried ceramic precursor material) or calcined alumina-based dispersion (i.e., calcined ceramic precursor material), which is typically in the form of particles that have a density of less than 80% (typically less than 60%) of theoretical and are capable of being sintered and/or impregnated with an impregnation composition and then sintered to provide alpha alumina-based ceramic material.

"Alpha alumina-based ceramic abrasive grain" as used herein refers to sintered, polycrystalline ceramic abrasive grain that have been sintered to a density of greater than 90% (preferably, at least 92%, more preferably, at least 94%, or even at least 95% or 97%) of theoretical, and contain, on a theoretical metal oxide basis, at least 60% by weight $Al_2O_3$, wherein at least 50% by weight of the $Al_2O_3$ is present as alpha alumina.

"Dispersion" refers to a solid-in-fluid (liquid and/or liquid and gas (e.g., air)) system wherein one phase comprises finely divided particles (in the colloidal size range) distributed throughout a fluid, and/or the fluid is distributed throughout the particles.

"Colloidal metal oxide sol" refers to a stable (i.e., the metal oxide solids in the sol or dispersion do not appear by visual inspection to begin to gel, separate, or settle upon standing undisturbed for about 2 hours) suspension of colloidal particles (preferably in a liquid medium having a pH of less than 6.5).

"Nucleating material" refers to material that enhances the transformation of transitional alumina(s) to alpha alumina via extrinsic nucleation. The nucleating material can be a nucleating agent (i.e., material having the same or approximately the same crystalline structure as alpha alumina, or otherwise behaving as alpha alumina) itself (e.g., alpha alumina seeds, alpha $Fe_2O_3$ seeds, or alpha $Cr_2O_3$ seeds) or a precursor thereof.

Abrasive grain made according to the methods of the present invention can be incorporated into abrasive products such as coated abrasives, bonded abrasives, non-woven abrasives, and abrasive brushes.

BRIEF DESCRIPTION OF THE DRAWING

FIGS. 4 and 6 are elevational plan views of an extruder useful in the methods according to the present invention, while

DETAILED DESCRIPTION OF PREFERRED EMBODIMENTS

Figure 1:
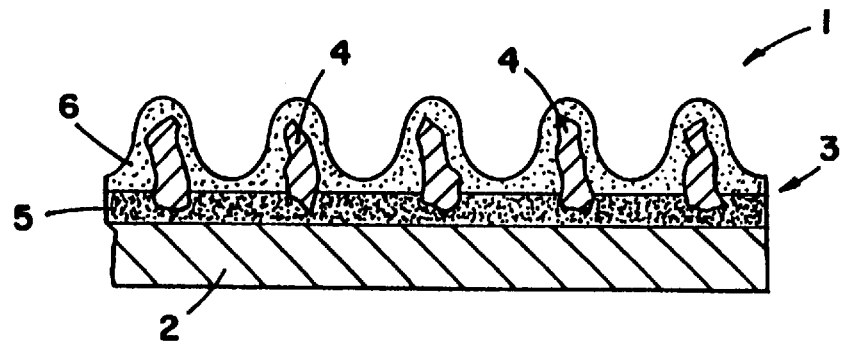
FIG. 1 is a fragmentary cross-sectional schematic view of a coated abrasive article including abrasive grain made according to the method of the present invention.

Preferably, the dispersion is made by combining or mixing components comprising liquid medium, acid, at least 35 percent by weight boehmite, and optionally metal oxide and/or precursors thereof.

The liquid medium in which the boehmite is dispersed is typically water (preferably deionized water), although organic solvents, such as lower alcohols (typically $C_{1-6}$ alcohols), hexane, or heptane, may also be useful as the liquid medium. In some instances, it is preferable to heat the liquid medium (e.g., 60–70° C.) to improve the dispersibility of the boehmite.

Typically, the dispersion comprises at least about 20% by weight (generally from about 20% to about 65% by weight) liquid medium, based on the total weight of the dispersion. More typically, the dispersion comprises, less than about 65% by weight or less, about 60% by weight or less, about 55% by weight or less, about 50% by weight or less, about 45% by weight or less, about 42% by weight or less, about 41% by weight or less, about 40% by weight or less, about 39% by weight or less, about 38% by weight or less, about 37% by weight or less, about 35% by weight or less, or about 25% by weight or less, liquid medium, based on the total weight of the dispersion.

In another aspect, the dispersion typically comprises greater than 35% by weight (generally from greater than 35% to about 80% by weight) solids, based on the total weight of the dispersion. Certain dispersions, however, comprise 40% by weight or more, 45% by weight or more, 50% by weight or more, 55% by weight or more, 58% by weight or more, 59% by weight or more, 60% by weight or more, 61% by weight or more, 62% by weight or more, 63% by weight or more, 65% by weight or more, 75% by weight or more, or even 80% by weight or more solids, based on the total weight of the dispersion.

In another aspect, the dispersion typically comprises greater than 35% by weight (generally from greater than 35% to about 80% by weight) boehmite, based on the total weight of the dispersion. Certain dispersions can, however, comprise 40% by weight or more, 45% by weight or more, 50% by weight or more, 55% by weight or more, 58% by weight or more, 59% by weight or more, 60% by weight or more, 61% by weight or more, 62% by weight or more, 63% by weight or more, 65% by weight or more, 75% by weight or more, or even 80% by weight or more boehmite, based on the total weight of the dispersion.

Weight percents of solids and boehmite above about 80 wt-% may also be useful, but tend to be more difficult to process to make the abrasive grain provided by the method according to the present invention.

Suitable boehmite can be prepared using various techniques known in the art (see, e.g., U.S. Pat. Nos. 4,202,870 (Weber et al.) and 4,676,928 (Leach et al.), the disclosures of which are incorporated herein by reference). Suitable boehmite can also be obtained, for example, from commercial sources such as Condea Chemie, GmbH of Hamburg, Germany (e.g., under the trade designation "DISPERAL"); and Vista Chemical Company of Houston, Tex. (e.g., under the trade designations "DISPAL", "CATAPAL A," "CATAPAL B," and "CATAPAL D"). These aluminum oxide monohydrates are in the alpha form, and include relatively little, if any, hydrated phases other than monohydrates (although very small amounts of trihydrate impurities can be present in some commercial grade boehmite, which can be tolerated). They typically have a low solubility in water, and have a high surface area (typically at least about 180 $m^2/g$). Boehmite typically includes at least about 2–6 percent by weight free water (depending on the humidity) on its surface, and such water contributes to the amount of liquid medium in the dispersion.

Preferably, the boehmite used in the method according to the present invention has an average ultimate particle size of less than about 20 nanometers (more preferably, less than about 12 nanometers), wherein "particle size" is defined by the longest dimension of a particle.

Peptizing agents are generally soluble ionic compounds which are believed to cause the surface of a particle or colloid to be uniformly charged in a liquid medium (e.g., water). Such charged particles generally repel each other, resulting in the formation of stable, non-flocculated suspensions or sols. It is also believed that steric stabilization may result in the formation of a stable suspension by the adsorption of nonionic macromolecules on the surface of the particles. Such macromolecules are believed to prevent particles from coming in close proximity where van der Waals interactions would cause bonding.

Suitable acids, which are believed to function as a peptizing agent, also referred to as a dispersant, include monoprotic acids and acid compounds, such as acetic, hydrochloric, formic, and nitric acid. Nitric acid is a preferred peptizing agent. Some commercial sources of boehmite may contain acid titer, such as absorbed formic or nitric acid on the surface thereof. The amount of acid used depends, for example, on the dispersibility of the boehmite, the percent solids of the dispersion, the components of the dispersion, the amounts, or relative amounts of the components of the dispersion, the particle sizes of the components of the dispersion, and/or the particle size distribution of the components of the dispersion. Typically, the dispersion contains at least 3% to 8% by weight acid, based on the weight of boehmite in the dispersion.

Optionally, the boehmite dispersion may contain metal oxide (e.g., particles of metal oxide which may have been added as a particulate (preferably having a particle size (i.e., the longest dimension) of less than about 5 micrometers; more preferably, less than about 1 micrometer) and/or added as a metal oxide sol (including colloidal metal oxide sol)) and/or metal oxide precursor (e.g., a salt such as a metal nitrate, a metal acetate, a metal citrate, a metal formate, or a metal chloride that, converts to a metal oxide upon decomposition by heating). The amount of such metal oxide and/or metal oxide precursor (that is in addition to the alumina provided by the boehmite) present in a dispersion or precursor (or metal oxide in the case of the abrasive grain) may vary depending, for example, on which metal oxide(s) is present and the properties desired for the sintered abrasive grain. For dispersions containing such metal oxides (and/or precursors thereof), the metal oxides (that are in addition to the alumina provided by the boehmite) are typically present, on a theoretical metal oxide basis, up to about 10 percent by weight (preferably, in the range from about 0.1 to about 10 percent; more preferably, in the range from about 0.5 to about 10 percent by weight), based on the total metal oxide content of the abrasive grain; or if the abrasive grain is to be "unseeded" (i.e., prepared without the use of nucleating material), such metal oxides are preferably present in the range from about 1 to about 10 percent (more preferably, about 2 to about 10 percent) by weight; although the amount may vary depending, for example, on which metal oxide(s) is present.

Metal oxide precursors include metal nitrate salts, metal acetate salts, metal citrate salts, metal formate salts, and metal chloride salts. Examples of nitrate salts include magnesium nitrate ($Mg(NO_3)_2 \cdot 6H_2O$), cobalt nitrate ($Co(NO_3)_2 \cdot 6H_2O$), nickel nitrate ($Ni(NO_3)_2 \cdot 6H_2O$), lithium nitrate ($LiNO_3$), manganese nitrate ($Mn(NO_3)_2 \cdot 4H_2O$), chromium nitrate ($Cr(NO_3)_3 \cdot 9H_2O$), yttrium nitrate ($Y(NO_3)_3 \cdot 6H_2O$), praseodymium nitrate ($Pr(NO_3)_3 \cdot 6H_2O$), samarium nitrate ($Sm(NO_3)_3 \cdot 6H_2O$), neodymium nitrate ($Nd(NO_3)_3 \cdot 6H_2O$), lanthanum nitrate ($La(NO_3)_3 \cdot 6H_2O$), gadolinium nitrate ($Gd(NO_3)_3 \cdot 5H_2O$), dysprosium nitrate ($Dy(NO_3)_3 \cdot 5H_2O$), europium nitrate ($Eu(NO_3)_3 \cdot 6H_2O$), ferric nitrate ($Fe(NO_3)_3 \cdot 9H_2O$), zinc nitrate ($Zn(NO_3)_2 \cdot 6H_2O$), erbium nitrate ($Er(NO_3)_3 \cdot 5H_2O$), and zirconium nitrate ($Zr(NO_3)_4 \cdot 5H_2O$).

Examples of metal acetate salts include zirconyl acetate ($ZrO(CH_3COO)_2$), magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, and dysprosium acetate. Examples of citrate salts include magnesium citrate, cobalt citrate, lithium citrate, and manganese citrate. Examples of formate salts include magnesium formate, cobalt formate, lithium formate, manganese formate, and nickel formate.

Although generally less preferred, metal chlorides may be used in place of, together with, or in addition to precursors such as the metal acetate, citrate, formate, and/or nitrate salts. Examples of chloride salts include magnesium chloride, cobalt chloride, nickel chloride, lithium chloride, manganese chloride, yttrium chloride, praseodymium chloride, samarium chloride, neodymium chloride, lanthanum chloride, gadolinium chloride, dysprosium chloride, europium chloride, ferric chloride, zinc chloride, titanium tetrachloride, and stannic chloride. Metal nitrate, acetate, citrate, formate, and chloride salts can be made by techniques known in the art, or obtained from commercial sources such as Alfa Chemicals of Ward Hill, Mass. and Mallinckrodt Chemicals of Paris, Ky.

The colloidal metal oxides are discrete finely divided particles of amorphous or crystalline metal oxide having one or more of their dimensions within a range of about 3 nanometers to about 1 micrometer. Metal oxide sols for use in methods according to the present invention include sols of ceria, silica, yttria, titania, lanthana, neodymia, zirconia, and mixtures thereof. Metal oxide sols are available, for example, from Nalco of Naperville, Ill.; and Eka Nobel of Augusta, Ga. Silica sols include those available under the trade designations "NALCO 1115," "NALCO 1130," "NALCO 2326," NALCO 1034A," and NALCOAG 1056" from Nalco Products, Inc. of Naperville, Ill., wherein the latter two are examples of acidic silica sols; and "NYACOL 215" from Eka Nobel, Inc. Ceria sols are available, for example, from Rhone-Ploulenc of Shelton, Conn.; Transelco of Penn Yan, N.Y.; and Fujimi Corp. of Japan. For more information on ceria, silica, or zirconia sols, see, for example, U.S. Pat. Nos. 5,429,647 (Larmie), 5,551,963 (Larmie), 5,611,829 (Monroe et al.), and 5,645,619 (Erickson et al.), the disclosures of which are incorporated herein by reference.

The metal oxide precursor in the dispersion may also be a precursor of colloidal metal oxide. Such precursors of colloidal metal oxide include a water-dispersible or water-soluble metal source that forms finely divided (1 nanometer to 1 micrometer) polymers or particles of metal oxide upon heating. Although a precursor of colloidal metal oxide is a material that is capable of forming finely divided metal oxide particles, it should be understood that the precursor of colloidal metal oxide need not form colloidal metal oxide under the conditions of the reactions described herein. The term colloidal metal oxide as used herein also encompasses chemical compounds colloidal in nature that comprise metal and oxygen (e.g., colloidal clays). This term also includes coated colloidal metal oxide, such as alumina-coated silica and zirconia-coated silica.

Whether from colloidal metal oxide directly, or from other forms or sources of colloidal metal oxide, the average metal oxide particle size in the colloidal metal oxide is preferably less than about 150 nanometers, more preferably less than about 100 nanometers, and most preferably less than about 50 nanometers. In some instances, the metal oxide particles can be on the order of about 3–10 nanometers. In most instances, the colloidal metal oxide comprises a distribution or range of metal oxide particle sizes.

Typically, the use of a metal oxide modifier can decrease the porosity of the sintered abrasive grain and thereby increase the density. Certain metal oxides may react with the alumina to form a reaction product and/or form crystalline phases with the alpha alumina which may be beneficial during use of the abrasive grain in abrading applications. For example, the oxides of cobalt, nickel, zinc, and magnesium typically react with alumina to form a spinel, whereas zirconia and hafnia do not react with the alumina. Alternatively, the reaction products of dysprosium oxide and gadolinium oxide with aluminum oxide are generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such aluminates have a hexagonal crystal structure. For additional details regarding the inclusion of metal oxide (and/or precursors thereof) in a boehmite dispersion see, for example, in U.S. Pat. Nos. 4,314,827 (Leitheiser et al.), 4,770,671 (Monroe et al.), 4,881,951 (Wood et al.) 5,429,647 (Larmie), and 5,551,963 (Larmie), and co-pending U.S. patent applications having U.S. Ser. Nos. 08/715,672 and 08/715,682), each filed Sep. 18, 1996, the disclosures of which are incorporated herein by reference.

Optionally, the boehmite dispersion contains nucleating material such as alpha alumina, alpha iron oxide, and/or an alpha iron oxide precursor. Typically, nucleating material, if present, comprises, on a theoretical metal oxide basis (based on the total metal oxide content of the calcined precursor material before sintering (or the sintered abrasive grain)), in the range from about 0.1 to about 5 percent by weight. Additional details regarding nucleating materials are disclosed, for example, in U.S. Pat. Nos. 4,623,364 (Cottringer et al.), 4,744,802 (Schwabel), 4,964,883 (Morris et al.), 5,139,978 (Wood), and 5,219,806 (Wood), the disclosures of which are incorporated herein by reference.

Sources of iron oxide, which in some cases may act as or provide a material that acts as a nucleating agent, include hematite (i.e., $\alpha$-$Fe_2O_3$), as well as precursors thereof (i.e., goethite ($\alpha$-FeOOH), lepidocrocite ($\gamma$-FeOOH), magnetite ($Fe_3O_4$), and maghemite ($\gamma$-$Fe_2O_3$)). Suitable precursors of iron oxide include iron-containing material that, when heated, will convert to $\alpha$-$Fe_2O_3$.

Iron oxide sources can be prepared by a variety of techniques well known in the art. For example, a dispersion of hematite ($\alpha$-$Fe_2O_3$) can be prepared by the thermal treatment of iron nitrate solutions, as is described, for example, by E. Matijevic et al., *J. Colloidal Interface Science*, 63, 509–24 (1978), and B. Voight et al., *Crystal Research Technology*, 21, 1177–83 (1986), the teachings of which are incorporated herein by reference. Lepidocrocite ($\gamma$-FeOOH) can be prepared, for example, by the oxidation of $Fe(OH)_2$ with a $NaNO_2$ solution. Maghemite ($\gamma$-$Fe_2O_3$) can be obtained, for example, by dehydrating $\gamma$-FeOOH in a vacuum. $\gamma$-FeOOH can also be converted to $\alpha$-$Fe_2O_3$, for example, by heating or grinding $\gamma$-FeOOH in air. Goethite ($\alpha$-FeOOH) can be synthesized, for example, by air oxidation of ferrous hydroxide or by aging a dispersion of ferric hydroxide at an elevated temperature and high pH. Additional information on the preparation of oxides of iron can be found, for example, in the articles by R. N. Sylva, *Rev. Pure Applied Chemistry*, 22, 15 (1972), and T. Misawa et al., *Corrosion Science*, 14 131 (1974), the teachings of which are incorporated herein by reference.

For additional details regarding the addition of iron sources to the dispersion or ceramic precursor material see, for example, U.S. Pat. Nos. 5,551,963 (Larmie), 5,611,829 (Monroe et al.), and 5,645,619 (Erickson et al.), the disclosures of which are incorporated herein by reference.

A dispersion can be prepared, for example, by gradually adding a liquid component(s) to a component(s) that is non soluble in the liquid component(s), while the latter is mixing or tumbling. For example, a liquid containing water, nitric acid, and metal salt can be gradually added to boehmite, while the latter is being tumbled such that the liquid is more easily distributed throughout the boehmite. Suitable mixers include pail mixers (available, for example, from Sears Roebuck and Co.), sigma blade mixers (available, for example, from Paul O. Abbe, Inc. of Little Falls, N.J.), and high shear mixers (available, for example, from Charles Ross & Son Co. of Hauppauge, N.Y.). Other suitable mixers may be available from Eirich Machines, Inc. of Gurnee, Ill.; Hosokawa-Bepex Corp. of Minneapolis, Minn. (including a mixer available under the trade designation "SCHUGI FLEX-O-MIX", Model FX-160); and Littleford-Day, Inc. of Florence, Ky. Other suitable preparation techniques may be apparent to those skilled in the art after reviewing the disclosure herein.

The dispersion typically gels prior to or during the deliquifying step. The addition of most modifiers can result in the dispersion gelling faster. Alternatively, ammonium acetate or other ionic species can be added to induce gelation of the dispersion. The pH of the dispersion and concentration of ions in the gel generally determines how fast the dispersion gels. Typically, the pH of the dispersion is within a range of about 1.5 to about 4. The dispersion is preferably gelled prior to the compaction step.

The dispersion (including in this context a gelled dispersion, or even partially deliquified dispersion) can be compacted, for example, by extrusion (e.g., a ram extruder or a conventional screw extruder). Examples of extruders include ram extruders, single barrel, double barrel, and segmented screw extruders. Suitable extruders are available, for example, from Loomis Products of Levitown, Pa., Bonnot Co. of Uniontown, Ohio, and Hosokawa-Bepex of Minneapolis, Minn., which offers, for example, an extruder under the trade designation "EXTRUD-O-MIX" (Model EM-6). Dispersions having solids levels less than 70–75 percent by weight tend to be more suitable for extruding than dispersions having solids levels greater than about 70–75 percent by weight. Other suitable techniques for compacting the dispersion may be apparent to those skilled in the art after reviewing the disclosure herein. In compacting the dispersion, it is understood that the dispersion is subjected to a pressure or force such as experienced, for example, in a pellitizer or die press (including mechanical, hydraulic and pneumatic or presses) or an extruder (i.e., all or substantially all of the dispersion experiences the specified pressure). In general, compacting the dispersion reduces the amount of air or gases entrapped in the dispersion, which in turn generally produces a less porous microstructure that is more desirable.

It may be preferred to select a compacting technique that provides a shaped mass (e.g., a rod, pyramid, triangular plate, diamond, or cone), or is compatible with another process step(s) to provide a shaped mass. For example, the dispersion can be extruded in the form of a rod, which can be deliquified and crushed or broken to provide smaller sized particles. The compacted dispersion can also be shredded and grated. If the shaped abrasive grain is a rod, it may have a diameter of, for example, about 150–5000 micrometers, and an aspect ratio (i.e., length to width ratio) of at least one, preferably at least two, and more preferably at least five.

In another aspect, the dispersion can be molded during or after compaction. A preferred method of molding the dispersion is by pressing, for example, with a roller or spatula, the compacted dispersion into a mold (or "production tool") having a plurality of cavities therein. The dispersion is preferably deliquified (typically dried) while still within the cavities of the production mold. The dried shaped dispersion is then removed from the production tool and further processed to provide sintered abrasive grain. Optionally, the dispersion can be calcined and even sintered while still within the production tool. In situations like this, the production tool should be able to withstand the calcining and possibly sintering temperatures, or be capable of being sacrificed (i.e., burned away).

The resulting shaped precursor particles have essentially the inverse shape of the mold cavities. Example shapes of the resulting particles include pyramids (having 3 to 10 sides, not including the base) and truncated pyramids, cones and truncated cones, frustoconical shapes, posts (having any polygonal cross section), and hemispheres. Further, it is not necessary that all the cavities in a single production tool are the same size and/or shape. For example, one area of the production tool can have, for example, equilateral pyramidal cavities 800 micrometers on each side, and another area can have four sided truncated pyramids 600 micrometers high with each base edge being 1000 micrometers in length. A production tool in which at least two adjacent cavities are not the same is taught in PCT published application having publication No. WO 95/07797, published Mar. 23, 1995, U.S. Pat. No. 5,672,097 (Hoopman et al.), the disclosures of which are incorporated herein by reference.

The production tool can be made of any of a variety of materials (e.g., polymeric (including polycarbonate), metal, or metal alloy), but is preferably a polymeric material (e.g., polypropylene). In some instances, it is preferable to provide a release coating on the surface of the production tool to facilitate release of the shaped particles from the tool. The polymer can be a grafted polymer.

Generally, a polymeric production tool can be made by molding from a master tool. The master tool can be, for example, a ceramic or composite, but is preferably metal, such as nickel or copper. A metal master tool can be made by methods such as diamond turning, knurling, or etching.

Additional details regarding the production tools, including methods for making and using such tools, can be found, for example, in U.S. Pat. Nos. 5,152,917 (Pieper et al.), 5,435,816 (Spurgeon et al.), and 5,500,273 (Holmes et al.), PCT published application having publication No. WO 95/07797, published Mar. 23, 1995; U.S. Pat. No. 5,672,097 (Hoopman et al.), the disclosures of which are incorporated herein by reference.

Additional details regarding shaped abrasive grain are disclosed, for example, in U.S. Pat. Nos. 5,090,968 (Pellow) and 5,201,916 (Berg et al.) and copending applications having U.S. Ser. Nos. 08/715,672 and 08/715,682, each filed Sep. 18, 1996, the disclosures of which are incorporated herein by reference.

Figure 4:
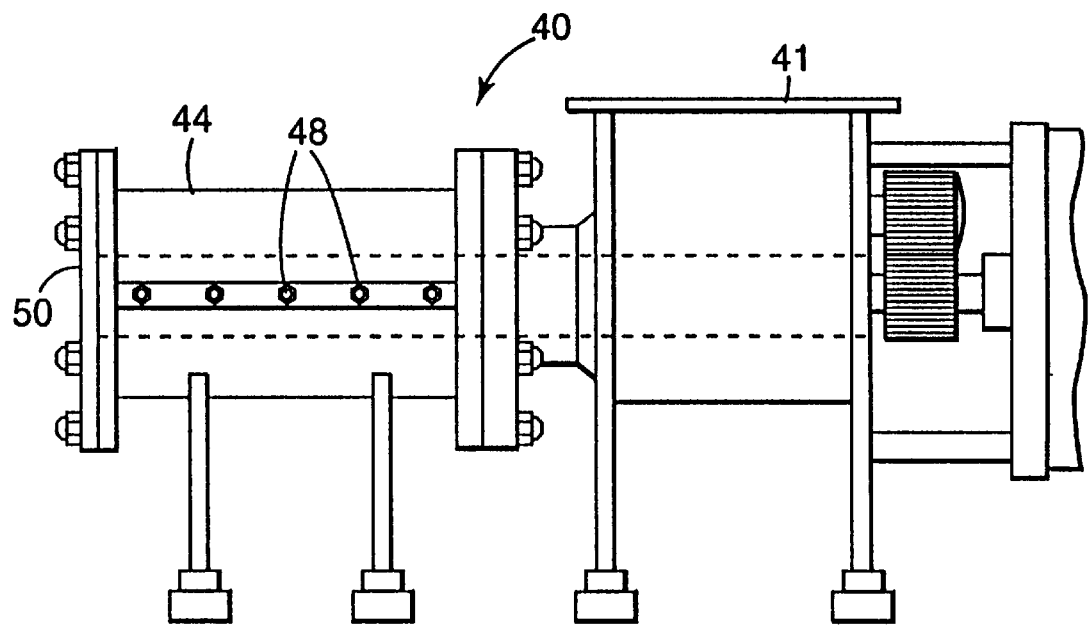
Figure 5:
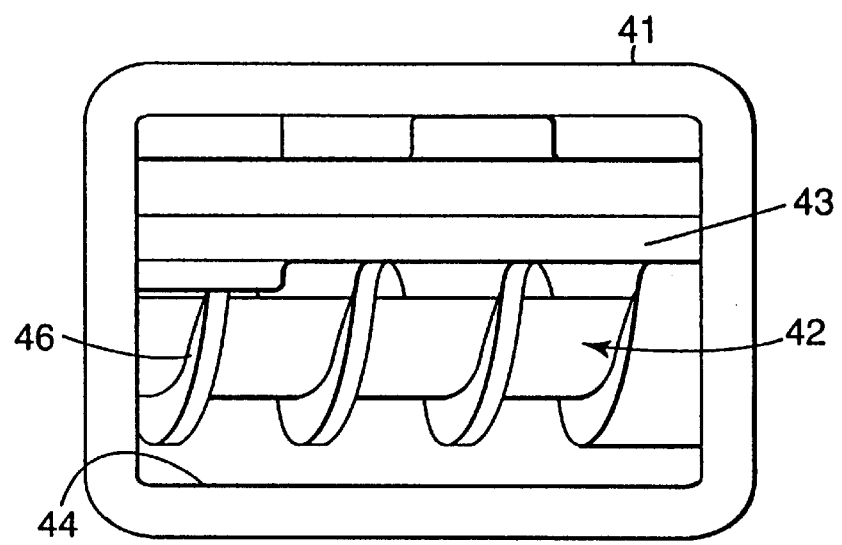
FIG. 5 is an enlarged top plan of the extruder feed port.
Figure 6:
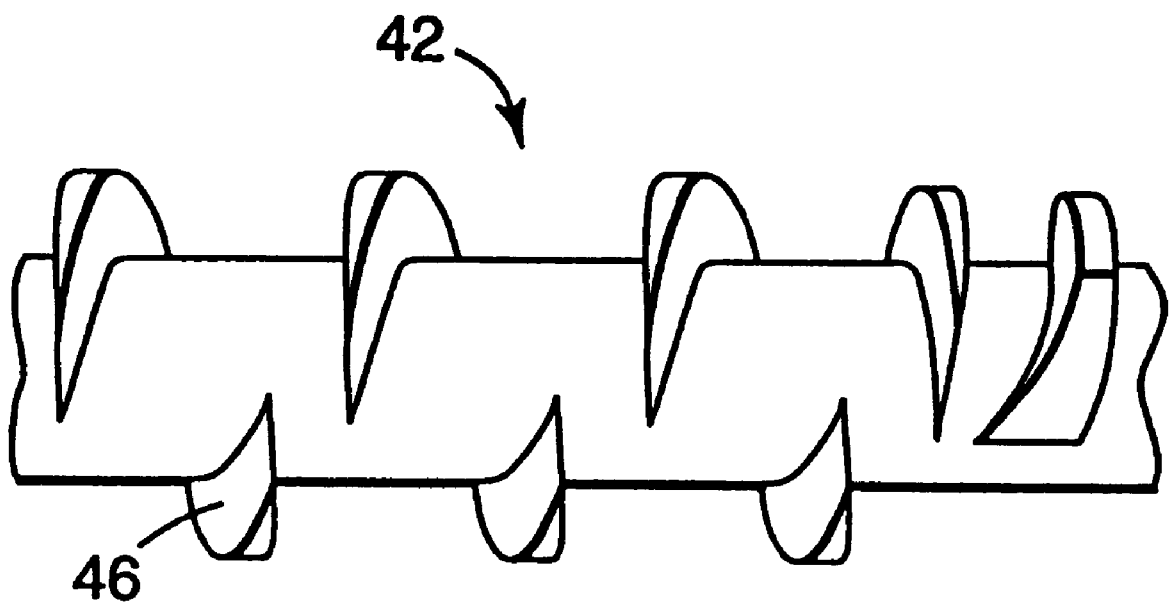

A preferred apparatus for compacting the dispersion (gelled or not) is illustrated in FIGS. 4–6. Modified segmented screw extruder 40, has feed port 41 and auger 42 centrally placed within barrel 44. FIG. 5 is a view of the interior of extruder 40 looking through feed port 41. Barrel 44 has grooves (not shown; generally known as "lands") running parallel down its length. Pins 48 extend centrally into barrel 44. Further, helical flight 46 extends the length of auger 42. Flight 46 is not continuous down the length of auger 42 but is segmented so that flight 46 on auger 42 does not come into contact with pins 48.

The dispersion (including in this context gelled dispersion) (not shown) is fed in feed port 41. Packer screw 43 urges the dispersion against auger 42 so that the dispersion is compacted by auger 42 and extruded through die 50. Die 50 can have a variety of apertures or holes therein (including a single hole or multiple holes). The die apertures can be any of a variety of cross sectional shapes, including a circle or polygon shapes (e.g., a square, star, diamond, trapezoid, or triangle). The die apertures can be any of a variety of sizes, but typically range from about 0.5 mm (0.02 inch) to 1.27 cm (0.5 inch), and more typically, from about 0.1 cm (0.04 inch) to about 0.8 cm (0.3 inch).

In general, techniques for deliquifying (including drying) the dispersion are known in the art, including heating to promote evaporation of the liquid medium, or simply drying in air. The deliquifying step generally removes a significant portion of the liquid medium from the dispersion; however, there still may be a minor portion (e.g., about 10% or less by weight) of the liquid medium present in the dried dispersion.

Irregularly shaped abrasive grain can be conveniently formed in general, for example, by placing compacted dispersion in any convenient size of drying vessel, such as one in the shape of a cake pan, drying, and then crushing.

One skilled in the art, after reviewing the disclosure herein, should be able to select other techniques for deliquifying the dispersion, as well as select appropriate conditions such as drying temperature(s), drying time(s), drying rate(s) (including the heating and/or cooling rate(s)), environment(s) (including relative humidity, pressure (i.e., atmospheric pressure or a pressure above or below the atmospheric pressure)), and/or the component(s) making up the deliquifying or drying atmosphere, other than those specifically provided herein. The more suitable deliquifying or drying conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the deliquifying technique (s), the drying temperature(s), the drying time(s), the drying rates(s), and the component(s) making up the deliquifying or drying atmosphere).

Deliquified dispersion or ceramic precursor material can be converted into smaller sized abrasive grain precursor material by any suitable conventional means (e.g., by crushing). Crushing or comminuting methods known in the art include hammer milling, roll crushing, pulverizing, and ball milling. It is much easier and requires significantly less energy to crush the deliquified dispersion than it does to crush calcined or sintered ceramic material. If the dispersion is shaped to a desired dimension and form, then the crushing or comminuting step is generally not necessary.

In general, techniques for calcining the deliquified dispersion or ceramic precursor material, wherein essentially all the volatiles are removed, and the various components that were present in the dispersion are transformed into oxides, are known in the art. Such techniques include using a rotary or static furnaces to heat the deliquified dispersion at temperatures ranging from about 400–1000° C. (typically from about 500–800° C.) until the free water, and typically until at least about 90 wt-% of any bound volatiles are removed.

One skilled in the art, after reviewing the disclosure herein, may be able to select other techniques for calcining the deliquified dispersion, as well as select appropriate conditions such as calcining temperature(s), calcining time (s), calcining rate(s), (including the heating and/or cooling rate(s)), environment(s) (including relative humidity, pressure (i.e., atmospheric pressure or a pressure above or below the atmospheric pressure)), and/or the component(s) making up the calcining atmosphere, other than those specifically provided herein. The more suitable calcining conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the calcining temperature(s), the calcining time (s), the calcining rates(s), and the component(s) making up the calcining atmosphere).

Preferred calcining temperatures are typically not greater than 800° C. (more typically in the range from about 500° C. to about 800° C. (more preferably, about 600° C. to about 700° C.). Temperatures below about 500° C. may be useful, but typically require longer calcining times. It may, however, be desirable to utilize several different calcining conditions (including different temperatures) wherein, for example, the deliquified dispersion is partially calcined for a time at a temperature(s) below about 500° C., and then further calcined at a temperature(s) above about 600° C. Temperatures above about 800° C. may also be useful, but tend to reduce the surface area of the alumina and thus decrease its reactivity. Heating for the calcining step, which can be done, for example, using electrical resistance or gas, can be on a batch basis or on a continuous basis.

Typically, the impregnation composition comprising a mixture comprising liquid medium and metal oxide, and/or precursors thereof, and, optionally, nucleating material). In general, methods of impregnating sol gel derived particles are described, for example, in U.S. Pat. No. 5,164,348 (Wood), the disclosure of which is incorporated herein by reference.

In general, ceramic precursor material (i.e., deliquified or dried alumina-based dispersion (or deliquified or dried ceramic precursor material), or calcined alumina-based dispersion (or calcined ceramic precursor material)) is porous. For example, a calcined ceramic precursor material generally has pores about 5–10 nanometers in diameter extending therein from an outer surface. The presence of such pores allows an impregnation composition comprising a mixture comprising liquid medium and appropriate metal oxide and/or precursor (preferably metal salts such as the metal nitrate, acetate, citrate, and formate salts described above with regard to preparation of a dispersion) to enter into, or in the case of particulate material on the surface of, ceramic precursor material. It is also within the scope of this invention to impregnate with an aluminum salt, although typically the impregnate is a salt other than an aluminum salt. The metal salt material is dissolved in a liquid medium, and the resulting solution mixed with the porous ceramic precursor particle material. The impregnation process is thought to occur through capillary action. The impregnation process can be improved by subjecting the porous ceramic precursor material to vacuum treatment before or during the mixing step.

The liquid media used for the impregnating composition is preferably water (including deionized water) and/or an organic solvent (preferably a non-polar solvent). If the particulate material is calcined prior to the impregnation step, water is the preferred liquid media for the impregnation composition. If the particulate material is not calcined prior to the impregnation step, the liquid media preferred is one that will not dissolve or soften the particulate material.

The concentration of the metal salt in the liquid medium is typically in the range from about 5% to about 40% dissolved solids, on a theoretical metal oxide basis. In general, there should be at least 50 ml of solution added to achieve impregnation of 100 grams of porous ceramic precursor particulate material, preferably, at least about 60 ml of solution to 100 grams of ceramic precursor particulate material.

In some instances, more than one impregnation step may be utilized. The same impregnation composition may be applied in repeated treatments, or subsequent impregnation compositions may contain different concentrations of the same salts, different salts, or different combinations of salts. Further, it is within the scope of the present invention to, for example, first impregnate the calcined precursor material with an impregnation composition comprising a mixture comprising liquid (e.g., water) and an acidic metal salt, and then further impregnate with a second impregnation composition comprising a mixture comprising liquid (e.g., water) and a base or basic salt (e.g., $NH_4OH$). Although not wanting to be bound by theory, it is believed that the second impregnation of the base or basic salt causes the impregnated acidic metal oxide precursor(s) to precipitate thereby reducing migration of the metal oxide precursors. For further details regarding multiple impregnations involving acidic and basic materials see, for example, U.S. Pat. Nos. 5,164,348 (Wood) and 5,527,369 (Garg), the disclosures of which are incorporated herein by reference.

In another aspect, the impregnation composition may be comprised of a mixture comprising liquid, an acidic metal salt and a base precursor (e.g., urea, formamide, acetamide, hydroxlamine, and methylamine), wherein the latter decomposes on heating to yield a base. Again, although not wanting to be bound by theory, it is believed that the base causes the impregnated acidic metal salt to precipitate thereby reducing migration of the metal oxide precursors.

During heat treatment of the impregnated particles to form the sintered, alpha alumina-based ceramic particles, the impregnate may react with alumina to form a reaction product. For example, the oxides of cobalt, nickel, zinc, and magnesium typically react with alumina to form a spinel structure. Yttria typically reacts with alumina to form $3Y_2O_3 \cdot 5Al_2O_3$, which has the garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula $LnMAl_{11}O_{19}$, wherein Ln is a trivalent metal ion such as La, Nd, Ce, Pr, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Hexagonal rare earth aluminates generally have exceptional properties in an abrasive particle and if present, are typically within the abrasive particle as a whisker(s) or platelet(s). Such whiskers or platelets typically have a length of about 0.5 micrometer to about 1 micrometer, and a thickness of about 0.1 micrometer or less. These whiskers or platelets are more likely to occur in the absence of a nucleating agent.

Additional details regarding the impregnation of porous, calcined alpha alumina-based precursor see copending application entitled "Method For Making Abrasive Grain Using Impregnation, And Abrasive Articles," having U.S. Ser. No. 08/781,557, filed the same date as the instant application, the disclosure of which is incorporated herein by reference.

It is also within the scope of the present invention to coat the abrasive grain with a surface coating such as described in U.S. Pat. Nos. 1,910,440 (Nicholson), 3,041,156 (Rowse), 5,009,675 (Kunz et al.), 4,997,461 (Markhoff-Matheny et al.), and 5,042,991 (Kunz et al.), 5,011,508 (Wald et al.), and 5,213,591 (Celikkaya et al.), the disclosures of which are incorporated herein by reference.

In general, techniques for sintering the calcined or ceramic precursor material, which include heating at a temperature effective to transform transitional alumina(s) into alpha alumina, to causing all of the metal oxide precursors to either react with the alumina or form metal oxide, and increasing the density of the ceramic material, are known in the art. As used herein, transitional alumina is any crystallographic form of alumina that exists after heating the hydrated alumina to remove the water of hydration prior to transformation to alpha alumina (e.g., eta, theta, delta, chi, iota, kappa, and gamma forms of alumina and intermediate combinations of such forms). The calcined material can be sintered, for example, by heating (e.g., using electrical resistance, plasma, microwave, laser, or gas combustion, on batch basis (e.g., using a static furnace) or a continuous basis (e.g., using a rotary kiln)) at temperatures ranging from about 1200° C. to about 1650° C. (typically, from about 1200° C. to about 1550° C., more typically, from about 1300° C. to about 1450° C., or even from about 1350° C. to about 1450° C.). The length of time which the calcined material is exposed to the sintering temperature depends, for example, on particle size, composition of the particles, and sintering temperature. Typically, sintering times range from a few seconds to about 60 minutes (preferably, within about 3–30 minutes). Sintering is typically accomplished in an oxidizing atmosphere, although neutral (e.g., argon or nitrogen) or reducing atmospheres (e.g., hydrogen or forming gas) may also be useful.

One skilled in the art, after reviewing the disclosure herein, may be able to select other techniques for sintering the calcined material, as well as select appropriate conditions such as sintering temperature(s), sintering time(s), sintering rate(s), (including the heating and/or cooling rate (s)), environment(s) (including relative humidity, pressure (i.e., atmospheric pressure or a pressure above or below the atmospheric pressure), and/or the component(s) making up the sintering atmosphere), other than those specifically provided herein. The more suitable sintering conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the sintering temperature(s), the sintering time (s), the sintering rates(s), and the component(s) making up the sintering atmosphere).

It may, however, be desirable to utilize several different sintering conditions (including different temperatures) wherein, for example, the calcined or ceramic precursor material is partially sintered for a time at a temperature(s) below 1200° C., and then further sintered at a temperature(s) above 1350° C.

Although not wanting to be bound by theory, it is believed that when a water soluble metal oxide precursor(s) is added to a dispersion having a solids level less than about 50 percent by weight, water tends to migrate to the surface where it evaporates, leading to increased levels of metal oxide precursor on or near the surface. The process of water migrating to the surface continues as the dispersion is dried generally until shrinkage of the dispersion reaches a level where the drying edge reaches the interior of the dispersion being dried. This effect tends to be less pronounced at 60 percent by weight solids than at 50 percent by weight solids. A result of having an increase in the amount of metal oxide precursor on the surface is that there is a depletion or decrease in the amount of such precursor material in the interior of the dried dispersion material. Further, it is believed that when the dispersion has a solids level above about 50 percent by weight, there is less shrinkage of the dispersion, and the drying edge reaches the interior of the dispersion being dried sooner, resulting in significantly less transport of metal oxide precursor onto the surface of the dried dispersion, ultimately contributing to the preparation of sintered abrasive grain wherein the metal oxides are essentially uniformly distributed throughout the abrasive grain (i.e., embodiments of abrasive grain made according to the method of the present invention can have the metal oxide modifier essentially uniformly distributed throughout the abrasive grain).

Additional details regarding sintering can be found, for example, in U.S. Pat. Nos. 4,314,827 (Leitheiser et al.), 5,489,204 (Conwell et al.), and 5,653,775 (Plovnick et al.), the disclosures of which are incorporated herein by reference.

Sintered alpha alumina-based abrasive grain made according to the method of the present invention typically comprise, on a theoretical metal oxide basis, at least 70 percent (preferably, at least 85 percent, more preferably, at least 90 percent, 95, 98, or even 99 percent) by weight $Al_2O_3$, based on the total weight of the abrasive grain, and have a Vickers hardness of at least about 16 GPa (preferably, at least about 18 GPa; more preferably at least about 19 GPa; and most preferably at least about 20 GPa).

The longest dimension of the alpha alumina-based abrasive grain is typically at least about 10 micrometers. The abrasive grain described herein can be readily made with a particle size of greater than about 100 micrometers, and larger abrasive grain (e.g., greater than about 150 micrometers or even greater than about 200 micrometers) can also be readily made. Generally, the preferred abrasive grain has a particle size in the range from about 10 to about 600 micrometers (typically in the range from about 10 to about 500 micrometers), although other sizes are also useful, and may even be preferred for certain applications.

The dried, calcined, and/or sintered materials provided during or by the method according to the present invention, are typically screened and graded using techniques known in the art. For example, the dried particles are typically screened to a desired size prior to calcining. The sintered abrasive grain are typically screened and graded prior to use in an abrasive application or incorporation into an abrasive article.

It is also within the scope of the present invention to recycle unused (typically particles too small in size to provide the desired size of sintered abrasive grain) deliquified dispersion material as generally described, for example, in U.S. Pat. No. 4,314,827 (Leitheiser et al.), the disclosure of which is incorporated herein by reference. For example, a first dispersion can be made as described above, dried, crushed, and screened, and then a second dispersion made by combining, for example, liquid medium (preferably, aqueous), boehmite, and deliquified material from the first dispersion, and optionally metal oxide and/or metal oxide precursor. Optionally, the first dispersion includes nucleating material. The recycled material may provide, on a theoretical metal oxide basis, for example, at least 10 percent, at least 30 percent, at least 50 percent, or even up to (and including) 100 percent of the theoretical $Al_2O_3$ content of the dispersion which is deliquified and converted (including calcining and sintering) to provide the sintered abrasive grain.

Screening and grading of abrasive grain made according to the method of the present invention can be done, for example, using the well known techniques and standards for ANSI (American National Standard Institute), FEPA (Federation Europeenne des Fabricants de Products Abrasifs), or JIS (Japanese Industrial Standard) grade abrasive grain.

Abrasive grain made according to the method of the present invention can be used in conventional abrasive products, such as coated abrasive products, bonded abrasive products (including grinding wheels, cutoff wheels, and honing stones), nonwoven abrasive products, and abrasive brushes. Typically, abrasive products (i.e., abrasive articles) include binder and abrasive grain, at least a portion of which is abrasive grain made according to the method of the present invention, secured within the abrasive product by the binder. Methods of making such abrasive products are well known to those skilled in the art. Furthermore, abrasive grain made according to the method according to the present invention can be used in abrasive applications that utilize slurries of abrading compounds (e.g., polishing compounds).

Coated abrasive products generally include a backing, abrasive grain, and at least one binder to hold the abrasive grain onto the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Preferred methods of making coated abrasive products are described, for example, in U.S. Pat. Nos. 4,734,104 (Broberg), 4,737,163 (Larkey), 5,203,884 (Buchanan et al.), 5,378,251 (Culler et al.), 5,417,726 (Stout et al.), 5,436,063 (Follett et al.), 5,496,386 (Broberg et al.), and 5,520,711 (Helmin), the disclosures of which are incorporated herein by reference.

The coated abrasive product can have an attachment means on its back surface to secure the coated abrasive product to a support pad or backup pad. Such attachment means can be, for example, a pressure sensitive adhesive or one side of a hook and loop attachment. The back side of the coated abrasive product may also contain a slip resistant or frictional coating. Examples of such coatings include an inorganic particulate material (e.g., calcium carbonate or quartz) dispersed in an adhesive.

An example of a coated abrasive product is depicted in FIG. 1. Referring to this figure, coated abrasive product 1 has a backing (substrate) 2 and abrasive layer 3. Abrasive layer 3 includes abrasive grain 4 secured to a major surface of backing 2 by make coat 5 and size coat 6. In some instances, a supersize coat (not shown) is used.

Figure 2:
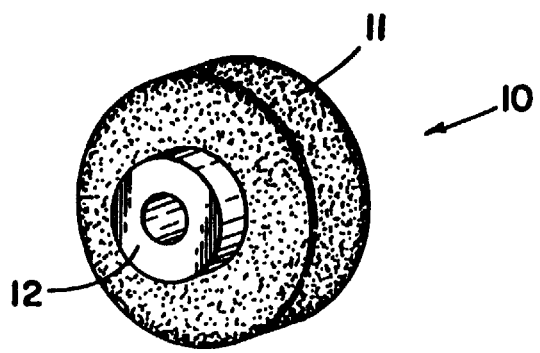
FIG. 2 is a perspective view of a bonded abrasive article including abrasive grain made according to the method of the present invention.

Bonded abrasive products typically include a shaped mass of abrasive grain held together by an organic, metallic, or vitrified binder. Such shaped mass can be, for example, in the form of a wheel, such as a grinding wheel or cutoff wheel. It can also be in the form, for example, of a honing stone or other conventional bonded abrasive shape. It is preferably in the form of a grinding wheel. Referring to FIG. 2, grinding wheel 10 is depicted, which includes abrasive grain 11, at least a portion of which is abrasive grain made according to the method of the present invention, molded in a wheel and mounted on hub 12. For further details regarding bonded abrasive products, see, for example, U.S. Pat. No. 4,997,461 (Markhoff-Matheny et al.), the disclosure of which is incorporated herein by reference. Preferred binders that can be used are curable at temperatures and under conditions that will not adversely affect the abrasive grain.

Figure 3:
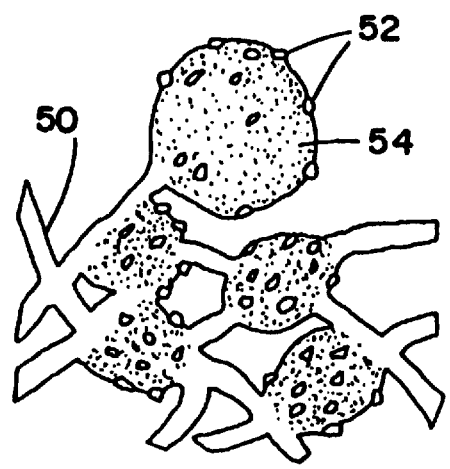
FIG. 3 is an enlarged schematic view of a nonwoven abrasive article including abrasive grain made according to the method of the present invention.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which abrasive grain 52, at least a portion of which is abrasive grain made according to the method of the present invention, are adhered by binder 54. For further details regarding nonwoven abrasive products, see, for example, U.S. Pat. No. 2,958,593 (Hoover et al.), the disclosure of which is incorporated herein by reference.

Useful abrasive brushes including abrasive grain made according to the method of the present invention include those having a plurality of bristles unitary with a backing (see, e.g., pending application having U.S. Ser. No. 08/431,910, filed Apr. 28, 1995, the disclosure of which is incorporated herein by reference). Preferably, such brushes are made by injection molding a mixture of polymer and abrasive grain.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or a filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

Abrasive grain made according to the method of the present invention, can include a surface coating. Surface coatings are known to improve the adhesion between the abrasive grain and the binder in abrasive products, and in some cases to improve the abrading properties of the abrasive grain. Such surface coatings are, for example, described in U.S. Pat. Nos. 5,011,508 (Wald et al.), 5,009,675 (Kunz et al.), 4,997,461 (Markhoff-Matheny et al.), 5,213,591 (Celikkaya et al.), 5,085,671 (Martin et al.), and 5,042,991 (Kunz et al.), the disclosures of which are incorporated herein by reference.

The abrasive products can contain 100% abrasive grain made according to the method of the present invention, or they can contain a blend of abrasive grain made according to the method of the present invention with conventional abrasive grain and/or diluent particles. However, at least about 5% by weight, and preferably about 30–100% by weight, of the abrasive grain in the abrasive products should be abrasive grain made according to the method of the present invention. Examples of suitable conventional abrasive grain include fused aluminum oxide, silicon carbide, diamond, cubic boron nitride, garnet, fused alumina zirconia, and other sol-gel abrasive grain, and the like. Examples of suitable diluent particles include marble, gypsum, flint, silica, iron oxide, aluminum silicate, glass, and diluent agglomerates. Abrasive grain made according to the method of the present invention can also be combined in or with abrasive agglomerates. An example of an abrasive agglomerate is described in U.S. Pat. Nos. 4,311,489 (Kressner), 4,652,275 (Bloecher et al.), and 4,799,939 (Bloecher et al.), the disclosures of which are incorporated herein by reference.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Density

The densities of sintered abrasive grain were determined (based on an average of three readings) with a helium gas pycnometer (available under the trade designation "MICROMERITICS ACCUPYC 1330" from Micromeritics Instruments Corp., Norcross, Ga.). It is well known in the art that this helium gas pycnometer method for determining density assumes there is essentially no porosity connected to the surface of the abrasive grain.

To access the surface and internal porosity connected to the surface of some abrasive grain (i.e., abrasive grain from Examples 44 and 45, and Illustrative Examples B and C), a sample of sintered abrasive grain was placed in a flask containing a red penetrating dye (available under the trade designation "P-303A Penetrant" from Uresco Androx of Cerritos, Calif.). The abrasive grain were thoroughly mixed to ensure complete coverage with the dye. The dye was then decanted off, and the abrasive grain rinsed with deionized water several times to remove the residual dye. A red color from the dye on the resulting abrasive grain denoted a highly porous abrasive grain, while abrasive grain which did not exhibit the red color were deemed to have essentially no porosity connected to the surface of the abrasive grain.

Hardness

The hardnesses of sintered abrasive grain were measured on polished cross-sections with a microhardness tester available under the trade designation "MITUTOYO MVK-VL" from Mitutoyo Corp. of Tokyo, Japan at a load of 500 grams. Five independent readings per sample (i.e., one reading per an abrasive grain) were averaged.

The percent solids levels given for some of the dispersion used in the following examples are the approximate solids levels, as they do not take into account the 2–6% water commonly found on the surface of boehmite, nor the solids provided by any non-boehmite additives.

Example 1

Example 1 was prepared by placing 500 grams of a nitric acid stabilized boehmite (commercially available from Condea Chemie of Hamburg, Germany under the trade designation "DISPERAL RS") in a 19 liter (5 gallon) pail mixer (30.5 cm diameter×33 cm tall (12 inch diameter×13 inches); available from Sears Roebuck and Co.). 330 grams of deionized water were sprayed (using a conventional hand pumped spray head and pump assembly, wherein the particular one used had a reference to U.S. Pat. No. 3,701,478 on it) onto the boehmite as it tumbled in the pail mixer such that the liquid was more easily distributed throughout the boehmite. A metal spatula was used to agitate the powder manually and reduce sticking of the material to the pail. The resulting gelled dispersion or agglomerated material was somewhat sticky but free-flowing. This agglomerated material was put into a 2.5 cm (1 inch) diameter pellet die and pressed at 18,182 kg (40,000 pounds) (using a Model M press from Fred S. Carver of Menomonee Falls, Wis.) into 2.5 cm (1 inch) diameter by 0.95 cm (⅜ inch) thick pellets. The pellets were dried at approximately 80° C. overnight in a conventional forced air oven, and then crushed using a mortar and pestle. The crushed material was screened to approximately −20+80 mesh (U.S. Standards screen size). The screened particles were calcined in a rotary kiln (15.24 cm inner diameter, 122 cm long stainless steel tube) at 650° C. for 3 minutes at temperature, and allowed to cool to room temperature.

The calcined particles were impregnated with a rare earth nitrate solution at a ratio of 1 gram of particles to 0.7 gram of solution by pouring the abrasive particles into a beaker containing the rare earth nitrate impregnation solution. The rare earth nitrate solution was prepared by mixing a lanthanum, neodymium, and yttrium nitrate (having, on a theoretical metal oxide basis, 23% rare earth oxide (i.e., $La_2O_3$, $Nd_2O_3$, and $Y_2O_3$); available from Molycorp of Lourviers, Colo.) with a sufficient amount of magnesium nitrate ($Mg(NO_3)_2 \cdot 6H_2O$) solution (having, on a theoretical metal oxide basis, 11% MgO; available from Mallinckrodt Chemical of Paris, Ky.) and cobalt nitrate ($Co(NO_3)_2 \cdot 6H_2O$) solution (having, on a theoretical metal oxide basis 19%

CoO; available from Hall Chemical of Wickliffe, Ohio) to provide a solution containing, on a theoretical metal oxide basis 5.8% $La(NO_3)_3.6H_2O$, 5.8% $Nd(NO_3)_3.6H_2O$, about 7.1% $Y(NO_3)_3.6H_2O$, about 14.4% $Mg(NO_3)_2.6H_2O$, about 0.4% $Co(NO_3)_2.6H_2O$, and the balance deionized water. The outer surfaces of the impregnated particles were dried (i.e., the internal portion of the particles still contained liquid) with a conventional hand held dryer, and calcined as described above. The particles were then sintered in a box furnace at 1420° C. for 20 minutes in a platinum dish.

The density of the sintered abrasive grain was 3.924 $g/cm^3$, which was about 97.7% of the theoretical density. The Vickers hardness of the sintered abrasive grain was 18 GPa.

Example 2

Example 2 was prepared by spraying (as described in Example 1) 240 grams of acidified water (prepared by mixing 300 grams of deionized water and 20 grams of concentrated (i.e., 70%) nitric acid) onto 500 grams of boehmite (commercially available from Condea Chemie under the trade designation "DISPERAL"), while the boehmite tumbled in the pail mixer. The resulting agglomerated material was further processed as described in Example 1, except the pellets were pressed at 13,636 kg (30,000 pounds). The density of the sintered abrasive grain was 3.878 $g/cm^3$, which was about 96.5% of the theoretical density.

Example 2 abrasive grain was screened to provide equal parts by weight of screen cuts −35+40 mesh and −40+45 mesh screen cuts (U.S. Standard screen sizes). The screened abrasive grain were incorporated into coated abrasive discs. These discs had a vulcanized fiber backing (17.78 cm (7 inch) diameter with a 2.2 cm diameter center hole), electrostatically coated abrasive grain, conventional $CaCO_3$ make, cryolite size, and $KBF_4$ filled epoxy supersize.

The abrasive performance of the discs was evaluated as follows. A disc was mounted on a beveled aluminum back-up pad, and used to grind the face of a 1.25 cm by 18 cm 304 stainless steel workpiece. The disc was driven at 5,500 rpm while the portion of the disc overlaying the beveled edge of the back-up pad contacted the workpiece at about a 6 kg load. Each workpiece was ground for a one minute interval. Ten workpieces were ground per disc. The abrasive performance was reported as a percent of a control (i.e., the total amount of metal removed for the control was equated to 100% and the abrasive grain of the example was measured relative to the 100%). The abrasive grain on the control abrasive discs was a conventional sol gel abrasive grain commercially available from the 3M Company of St. Paul, Minn. under the trade designation "321 CUBITRON". The total cut (an average of three discs) of the Example 2 coated abrasive discs was 79% of the control discs.

Example 3

Example 3 was prepared by mixing 125 grams of a nitrate stabilized zirconia sol (commercially available from Nyacol Products Inc. of Ashland, Mass. under the trade designation "NYACOL ZR 10/20"; 5–10 nm average particle size) with 135 grams of deionized water. This resulting material was sprayed (as described in Example 1) onto 500 grams of acid stabilized boehmite ("DISPERAL RS"), while the latter tumbled in the pail mixer. The resulting agglomerated material was further processed as described in Example 1, except the pellets were pressed at 15,909 kg (35,000 pounds), and crushed using a disc pulverizer (type U.A., manufactured by Bico-Braun Corp. of Los Angeles, Calif.). The density of the sintered abrasive grain was 3.99 $g/cm^3$.

The abrasive particles of Example 3 were screened and incorporated into coated abrasive discs and tested as described in Example 2. The total cut (an average of three discs) of the Example 3 coated abrasive discs was 88% of the control discs.

Examples 4 and 5

Example 4 was prepared by first mixing 1194 parts of boehmite ("DISPERAL") with 3000 parts of acidified water (prepared by mixing 3000 parts of deionized water and 71 parts of concentrated nitric acid) using a continuous mixer to form a dispersion. The dispersion was dried at less than 160° C. for less than 48 hours. The dried material was crushed, and then screened to produce −120 mesh (U.S. Standards screen size) particles.

500 grams of the −120 mesh dried particles were placed in the pail mixer and 275 grams of deionized water were sprayed onto the dried particles as described in Example 1. The resulting 65% solids, agglomerated material was pressed as described in Example 1, except the compaction was at 1364 kg (3,000 pounds) under a vacuum (approximately 635 mm Hg (25 inches Hg)). After crushing on the disc pulverizer as in Example 3, the particles were screened, calcined, impregnated with rare earth nitrate solution, dried, calcined, and sintered as described in Example 1, except the sintering temperature was 1430° C., and the crushed material was screened to remove particles less than 60 mesh (U.S. Standard size) in size. The density of the sintered abrasive grain was 3.99 $g/cm^3$, which was about 99.3% of the theoretical density.

Example 5 was prepared as described in Example 4, except no vacuum was applied to the die during pressing. The density of the sintered abrasive grain was 3.97 $g/cm^3$, which was about 98.8% of the theoretical density.

Example 4 and 5 abrasive grain were each incorporated into coated abrasive discs. These discs had a vulcanized fiber backing (7.78 cm (7 inch) diameter with a 2.2 cm diameter center hole), electrostatically coated abrasive grain (on the outer 3.8 cm (1.5 inches) of the backing), conventional $CaCO_3$ make, cryolite size and $KBF_4$ filled epoxy supersize. The abrasive grain had been screened to provide an equal mixture of −35+40 mesh and −40+45 mesh particles.

The abrasive performance of the discs was evaluated as follows. A disc was mounted on the back-up pad as described in described in Example 2. The 1.8 mm peripheral edge of an approximately 25 cm diameter 304 stainless steel disc shaped workpiece deployed 18.5° from a position normal to the abrasive disc and rotated counter clockwise at 2 rpm, was placed into contact with the abrasive face of the abrasive disc under a load of 4 kg. The speed of the coated abrasive disc during the test was 3550 rpm. The workpiece was weighed at 2 minutes intervals to determine the amount of steel removed after each two minutes of grinding. The test endpoint was 20 minutes of grinding. The performance of the abrasive grain was stated as percent of a control. The abrasive grain on the control abrasive discs were conventional sol gel abrasive grain commercially available from the 3M Company under the trade designation "321 CUBITRON". The total cut (an average of two discs) of the Example 4 and 5 coated abrasive discs were both 90% of the control discs.

Examples 6 and 7

Example 6 was prepared by spraying (as described in Example 1) 125 grams of deionized water onto 500 grams of acid stabilized boehmite ("DISPERAL RS"), while the latter was mixing in the pail mixer. The resulting 80% solids, agglomerated material was pressed under vacuum at 16,909 kg (35,000 pounds) to form 2.5 cm (1 inch) diameter pellets. The pellets were dried, crushed, screened to remove particles less than 60 mesh in size, calcined, impregnated, dried, and calcined as described in Example 1. The calcined, impregnated particles were sintered in a rotary kiln (120 cm long, 7.5 cm inner diameter, SiC tube) at 1420° C. for 3 minutes at temperature. The density of the sintered abrasive grain was 3.94 g/cm$^3$; the Vickers hardness 17.8 GPa.

Example 7 was prepared by spraying (as described in Example 1) 240 grams of acidified water (prepared by mixing 20 grams of nitric acid with 300 grams of water) to 500 grams of boehmite ("DISPERAL"), while the latter tumbled in the pail mixer. The resulting agglomerated material was pressed in a 2.5 cm die at 2273 kg (5,000 pounds) as described in Example 1, and then further processed as described in Example 6. The density of the sintered abrasive grain was 3.90 g/cm$^3$, which was about 97.1% of the theoretical density; the Vickers hardness 16.5 GPa.

Example 6 and 7 abrasive grain were each screened to provide equal parts by weight of screen cuts −25+30 mesh and −30+35 mesh screen cuts (U.S. Standard screen sizes). Screened abrasive grain was incorporated into coated abrasive discs, and evaluated; as describe in Examples 4 and 5, except a 5 minute grinding interval was used in place of the two minute grinding interval. The total cut (an average of three discs) of the Example 6 and 7 coated abrasive discs were 46%, and 62%, respectively, of the control discs.

Examples 8–10

Example 8 was prepared by feeding 204 kg (448 pounds) per hour of the dried gel described in Example 5 and 175 liters (46 gallons) per hour of tap water into a mixer (available under the trade designation "SCHUGI FLEX-O-MIX", Model FX-160, from Hosokawa-Bepex Corp. of Minneapolis, Minn.). The resulting 54% solids, agglomerated material was fed by hand into an extruder (available under the trade designation "EXTRUD-O-MIX", Model EM-6 from Hosokawa-Bepex) with an end plate containing twenty 0.8 cm (5/16 inch) circular openings. The extruded rods were further processed as described in Example 6, except the dried material was crushed using the disc pulverizer. The density of the sintered abrasive grain was 3.92 g/cm$^3$, which was about 97.6% of the theoretical density; the Vickers hardness 19.0 GPa.

Example 9 was prepared by feeding 204 kg (448 pounds) per hour of the dried gel described in Example 5 and 114 liters (46 gallons) per hour of tap water into the mixer described in Example 8 ("SCHUGI FLEX-O-MIX"). The resulting 64% solids, agglomerated material was fed into an extruder (available under the trade designation "L200/50P GEAR EXTRUDER" from Hosokawa-Bepex) in which the gear rolls had been replaced with solid rolls. The agglomerated material was compressed into a solid ribbon between the rolls. The ribbon was dried, crushed, calcined, impregnated, dried, calcined, and sintered as described in Example 6. The density of the sintered abrasive grain was 3.92 g/cm$^3$, which was about 97.6% of the theoretical density; the Vickers hardness 19.0 GPa.

Example 10 was prepared as described in Example 8, except 114 liters (30 gallons) per hour of water were used to make 65% solids, agglomerated material. This agglomerated material was fed into the gear pelletizer with gear rolls installed such that the gel was forced through about ninety six 0.47 cm (3/16 inch) circular openings in the gear lands. (The gel was extruded into the hollow interior of the gear rolls). The extruded rods were further processed as described in Example 6. The density of the sintered abrasive grain was 3.93 g/cm$^3$, which was about 97.8% of the theoretical density; the Vickers hardness 18.9 GPa.

Example 8–10 abrasive grain were each screened to provide equal parts by weight of screen cuts −25+30 mesh and −30+35 mesh screen cuts. Screened abrasive grain was incorporated into coated abrasive discs and evaluated on 304 stainless steel workpieces as described in Example 2. The total cut (an average of four discs) of the Example 8, 9, and 10 coated abrasive discs were 149%, 88%, and 101%, respectively, of the control discs.

Example 11

Example 11 was prepared by spraying (as described in Example 1) 305 grams of an acidified water (prepared by mixing 400 grams deionized water and 44 grams concentrated nitric acid) onto 500 grams of boehmite ("DISPERAL"), while the latter tumbled in the pail mixer. The resulting 62% solids, agglomerated material was extruded on a Carver Press (see Example 1) using a 2.5 cm (1 inch) diameter die having one 0.8 mm (1/32 inch) circular opening. The rods were further processed as described in Example 6. The density of the sintered abrasive grain was 3.91 g/cm$^3$, which was about 97.3% of the theoretical density; the Vickers hardness 19.4 GPa.

Example 11 abrasive grain was screened to provide equal parts by weight of screen cuts −40+45 mesh and −45+50 mesh screen cuts (U.S. Standard screen sizes). Screened abrasive grain was incorporated into coated abrasive discs, and evaluated as described in Examples 4 and 5. The total cut (an average of three discs) of the Example 11 coated abrasive discs was 100% of the control discs.

Example 12

Example 12 was prepared by feeding 136 kg (300 pounds) per hour of boehmite ("DISPERAL") in the mixer described in Example 8 ("SCHUGI FLEX-O-MIX"). Nitric acid mixed with tap water at a ratio of 1:4.64 was fed into the mixer at a rate of 45.4 kg (99.9 pounds) per hour along with an additional 18.95 kg (41.7 pound) per hour of tap water. The resulting 70% solids, agglomerated material was fed into the L200/50P Gear Extruder (as described in Example 9), except the solid rolls had been replaced with the perforated gear rolls, and was extruded at 9 RPM and 30 KN pressure through about 96 0.5 cm (3/16 inch) circular openings. The rods were further processed as described in Example 6. The density of the sintered abrasive grain was 3.94 g/cm$^3$, which was about 98.1% of the theoretical density; the Vickers hardness 18.5 GPa.

Example 12 abrasive grain was screened to provide equal parts by weight of screen cuts −25+30 mesh and −30+35 mesh screen cuts. Screened abrasive grain was incorporated into coated abrasive discs, and evaluated as described in Example 2, except that a 10 minutes end point was used. The total cut (an average of four discs) of the Example 12 coated abrasive discs was 110% of the control discs.

Example 13

Example 13 was prepared as described for Example 12. The resulting 70% solids, agglomerated material was compacted into a ribbon of gel material as described in Example 9, and then further processed as described in Example 6.

Example 13 abrasive grain was screened to provide equal parts by weight of screen cuts −25+30 mesh and −30+35 mesh screen cuts. Screened abrasive grain was incorporated into coated abrasive discs, and evaluated as described in Example 2, except that a 12 minutes end point was used. The total cut (an average of four discs) of the Example 13 coated abrasive discs was 106% of the control discs.

Examples 14–16

Example 14 was prepared as described for Example 12 except the water was fed at 121 kg (267 pounds) per hour to produce 55% solids, agglomerated material. The agglomerated gel material was placed in the barrel of the ram extruder (Model 232-20L from Loomis Corp.) and extruded through one 0.63 cm (¼ inch) circular opening. The extruded rods were dried and further processed as described in Example 6. The density of the sintered abrasive grain was 3.893 g/cm$^3$, which was about 96.9% of the theoretical density; the Vickers hardness 18.4 GPa.

Example 15 was prepared as described for Example 14 except 203 kg (448 pounds) per hour of dried gel particles (as described in Example 4) and water at 117 kg (258 pounds) per hour were fed into the mixer described in Example 8 ("SCHUGI FLEX-O-MIX") to provide a 61.6% solids, agglomerated gel material. The density of the sintered abrasive grain was 3.86 g/cm$^3$, which was about 96.1% of the theoretical density; the Vickers hardness 17.1 GPa.

Example 16 was prepared as described in Example 14 except the water was fed at 28 kg (62 pounds) per hour to produce a 69.3% solids, agglomerated gel material. The density of the sintered abrasive grain was 3.923 g/cm$^3$, which was about 97.6% of the theoretical density; the Vickers hardness 18.5 GPa.

Example 14, 15, and 16 abrasive grain were each screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 14, 15, and 16 coated abrasive discs were 88%, 86%, and 84%, respectively of the control discs.

Example 17 and Illustrative Example A

Illustrative Example A was prepared by slowly adding 40 grams of polyethylene glycol (commercially available from Union Carbide Corp. under the trade designation "CARBOWAX 20M") to 400 grams of deionized water. Next, 60 grams of nitric acid and 119 grams of the rare earth nitrate solution were added. The resulting solution was sprayed (using the spray head referred to in Example 1 equipped with a pump (available under the trade designation "MASTERFLEX L/S" having a size 16 hose from Cole Parmer of Niles, Ill.)) at the rate of 150 ml/min onto 1000 grams of boehmite ("DISPERAL"), while the latter tumbled in the pail mixer. The resulting 65% solids, agglomerated gel material was extruded through one 0.63 cm (¼ inch) circular opening as described in Example 14. The rods were further processed as described in Example 6.

X-ray fluorescence (XRF) analysis of the sintered abrasive grain indicated, on a theoretical metal oxide basis, the following amounts of oxides 1.4% MgO, 1.4% $Y_2O_3$, 1.5% $La_2O_3$, and 1.4% $Nd_2O_3$. The density of the sintered abrasive grain was 3.90 g/cm$^3$, which was about 97.1% of the theoretical density.

Example 17 was prepared as described for Illustrative Example A except no rare earth nitrate solution was used to form the gel. Rather, the rare earth nitrate solution (including the magnesium nitrate and cobalt nitrate)) was introduced to the calcined material via impregnation as described in Example 1.

X-ray fluorescence (XRF) analysis of the sintered abrasive grain indicated, on a theoretical metal oxide basis, the following amounts of oxides: 1.4% MgO, 1.3% $Y_2O_3$, 1.5% $La_2O_3$, and 1.4% $Nd_2O_3$. The density of the sintered abrasive grain was 3.92 g/cm$^3$, which was about 97.6% of the theoretical density.

Example 17 and Illustrative Example A abrasive grain were each screened to provide equal parts by weight of screen cuts −25+30 mesh and −30+35 mesh screen cuts. Screened abrasive grain was incorporated into coated abrasive discs, and evaluated as described in Example 2, except that a 10 minutes end point was used. The total cut (an average of four discs) of the Example 17 and Comparative Example A coated abrasive discs was 112% and 115%, respectively, of the control discs.

Example 18

Example 18 was prepared by dissolving 20 grams of polyethylene glycol ("CARBOWAX 20M") in 190 grams of deionized water. Next, 60 grams of concentrated nitric acid were added and the resulting solution sprayed (as described in Example 17) onto 1000 grams of boehmite ("DISPERAL"), while the latter was mixing in the pail mixer. The resulting 80% solids, gelled dispersion was pressed in a 4.45 cm (1.75 inch) diameter die from a fill depth of 5 cm (2 inches) to a pressed thickness of 1.9 cm (0.75 inch) using a 150 ton Kux mechanical press. About 20 such pellets were pressed. The pellets were further processed as described in Example 6, except the dried material was crushed with the disc pulverizer. The resulting calcined material was sintered at 1420° C. in the rotary kiln (see Example 6) for 3 minutes at temperature. The density of the sintered abrasive grain was 3.89 g/cm$^3$, which was about 96.8% of the theoretical density.

Example 18 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of two discs) of the Example 18 coated abrasive discs was 62% of the control discs.

Example 19

Example 19 was prepared by combining 20 grams of 1 to 10 micrometer graphite flakes (available from Superior Graphite) with 1000 grams of acid stabilized boehmite ("DISPERAL RS") in a high shear mixer (available under the trade designation "WARING" from Waring Products of Hartford, Conn.). The resulting mixture was transferred to the pail mixer. 250 grams of deionized water were sprayed (as described in Example 17) onto the boehmite/graphite, while the latter tumbled in the pail mixer. The resulting 80% solids, gelled dispersion was further processed as in Example 18, except that the fill depth in the die was reduced to 2 cm (0.8 inch). The density of the sintered abrasive grain was 3.94 g/cm$^3$, which was about 98.1% of the theoretical density.

Example 19 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of two discs) of the Example 19 coated abrasive discs was 58% of the control discs.

Example 20

Example 20 was prepared as described in Example 19 except no graphite was added. The density of the sintered abrasive grain was 3.93 g/cm$^3$, which was about 97.8% of the theoretical density.

Example 20 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of two discs) of the Example 20 coated abrasive discs was 56% of the control discs.

Example 21

Example 21 was prepared by combining 273 grams of deionized water and 60 grams nitric acid and then spraying (as described in Example 17) the resulting mixture onto 1000 grams of boehmite ("DISPERAL"), while the latter tumbled in the pail mixer. The resulting 75% solids, gelled dispersion was further processed as described in Example 18. The density of the sintered abrasive grain was 3.89 g/cm$^3$, which was about 96.8% of the theoretical density.

Example 21 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of two discs) of the Example 21 coated abrasive discs was 52% of the control discs.

Example 22

Example 22 was prepared as described in Example 21, except 190 grams of deionized water and 60 grams of nitric acid were combined and sprayed onto to the 1000 grams of boehmite to provide an 80% solids, gelled dispersion. The density of the sintered abrasive grain was 3.89 g/cm$^3$, which was about 96.8% of the theoretical density.

Example 22 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of two discs) of the Example 22 coated abrasive discs was 45% of the control discs.

Example 23

Example 23 was prepared as described in Example 21, except 411 grams of deionized water and 60 grams of nitric acid were combined and sprayed onto the 1000 grams of boehmite to produce a 68% solids, gelled dispersion which was then extruded and further processed as described in Example 14. The density of the sintered abrasive grain was 3.94 g/cm$^3$, which was about 98.1% of the theoretical density; the Vickers hardness 16.9 GPa.

Example 23 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of three discs) of the Example 23 coated abrasive discs was 113% of the control discs.

Example 24

Example 24 was prepared as described in Example 23 except 40 grams of polyethylene glycol ("CARBOWAX 3350") were dissolved in the water before the acid was added. The polyethylene glycol was added to improve the extrusion behavior of the gel. The resulting solution was sprayed onto 1000 grams of boehmite (commercially available from Vista Chemical Company of Houston, Tex. under the trade designation "CATAPAL D"). The resulting mixture was rather dry, so an additional 132 grams of water were added. The resulting 61% solids, gelled dispersion was then further processed as described in Example 23. The density of the sintered abrasive grain was 3.90 g/cm$^3$, which was about 97.1% of the theoretical density; the Vickers hardness 17.4 GPa.

Example 24 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of three discs) of the Example 24 coated abrasive discs was 103% of the control discs.

Example 25

Example 25 was prepared as described in Example 16 except 20 grams of polyethylene glycol ("CARBOWAX 3350") were added to the water. The density of the sintered abrasive grain was 3.89 g/cm$^3$, which was about 96.8% of the theoretical density; the Vickers hardness 17.4 GPa.

Example 25 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 25 coated abrasive discs was 103% of the control discs.

Example 26

Example 26 was prepared by combining 391 grams of deionized water, 20 grams of glycerol and 60 grams nitric acid. The resulting mixture was sprayed (as described in Example 17) onto 1000 grams of boehmite ("DISPERAL"), while the latter was mixing in the pail mixer. The resulting 68% solids, gelled dispersion was further processed as described in Example 23. The density of the sintered abrasive grain was 3.92 g/cm$^3$, which was about 97.6% of the theoretical density; the Vickers hardness 17.3 GPa.

Example 26 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of three discs) of the Example 26 coated abrasive discs was 118% of the control discs.

Example 27

Example 27 was prepared as described in Example 26 except 40 grams of polyethylene glycol ("CARBOWAX 3350") and 20 grams of glycerol were added, and 587 grams of water were used. The resulting solution was sprayed (as described in Example 17) onto 1000 grams of boehmite ("CATAPAL D") to provide a 60% solids, gelled dispersion. The density of the sintered abrasive grain was 3.89 g/cm$^3$, which was about 96.8% of the theoretical density; the Vickers hardness 17.4 GPa.

Example 27 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 27 coated abrasive discs was 100% of the control discs.

Example 28

Example 28 was prepared as described in Example 26 except 391 grams of deionized water were used, and the boehmite used was that available under the trade designation "CATAPAL D". The resulting gelled dispersion was 60% solids. The density of the sintered abrasive grain was 3.88 g/cm$^3$, which was about 96.6% of the theoretical density; the Vickers hardness 17.4 GPa.

Example 28 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 28 coated abrasive discs was 103% of the control discs.

Example 29

Example 29 was prepared as described in Example 26 except a mixture of 100 grams of glycerol, 60 grams of nitric acid, and 378 grams of deionized water was sprayed (as described in Example 17) onto 1000 grams of boehmite ("DISPERAL") to provide a 65% solids, gelled dispersion.

Example 29 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 29 coated abrasive discs was 128% of the control discs.

Example 30

Example 30 was prepared by spraying (as described in Example 17) acidified water (prepared by mixing 60 grams of nitric acid with 607 grams of deionized water) onto 1000 grams of boehmite ("CATAPAL D"), while the latter tumbled in the pail mixer. The resulting 61% solids, gelled dispersion was further processed as described in Example 18. The density of the sintered abrasive grain was 3.89 g/cm$^3$, which was about 96.8% of the theoretical density; the Vickers hardness 17.5 GPa.

Example 30 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 30 coated abrasive discs was 112% of the control discs.

Example 31

Example 31 was prepared by placing 8 kilograms of boehmite ("DISPERAL") in a sigma blade mixer (available from Paul O. Abbe, Inc. of Little Falls, N.J.; of Aurora, Ill.), and then slowly adding acidified water (prepared by mixing 3.8 kilograms of deionized water and 480 grams of nitric acid) to the boehmite, while the latter was being mixed. The resulting 65% solids, gelled dispersion was then extruded using a catalyst extruder (available from Bonnot Co. of Uniontown, Ohio) through a die having thirty six 0.48 cm (3/16 inch) circular openings. The resulting rods were further processed as described in Example 6. The density of the sintered abrasive grain was 3.933 g/cm$^3$, which was about 97.9% of the theoretical density; the Vickers hardness 17.78 GPa.

Example 31 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 31 coated abrasive discs was 123% of the control discs.

Example 32

Example 32 was prepared by spraying (using a pump available under the trade designation "MASTERFLEX I/P" having a size 73 hose, and a spray head available under the trade designation "COLE PARMER G-83251-20", from Cole Parmer of Niles, Ill.) acidified water (prepared mixing 5.2 kilograms of deionized water with 720 grams of nitric acid) at the rate of 800 ml/min onto 12 kilograms of boehmite ("DISPERAL"), while the latter was mixing in a paddle mixer (model TM-60; formerly available from Toledo Kitchen Machinery Division of Toledo Scale Co. of Rochester, N.Y.). The resulting gel was extruded through a 0.63 cm (1/4 inch) opening using the extruder described in Example 14, and then further processed as described in Example 7. The density of the sintered abrasive grain was 3.93 g/cm$^3$, which was about 97.8% of the theoretical density.

Example 32 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 32 coated abrasive discs was 99% of the control discs, and 142% of another set of control discs made using equal parts by weight of screen cuts −25+30 mesh and −30+35 mesh screen cuts of fused alumina-zirconia abrasive grain (commercially available from Norton Co., under the trade designation "NORZON").

Examples 33 and 34

Example 33 was prepared as described in Example 31 except 100 parts of boehmite ("DISPERAL"), 6 parts of concentrated nitric acid, and 48 parts of deionized water were used to produce a 65% solids, gelled dispersion, which was extruded with the Loomis 20 ton ram extruder.

Example 34 was prepared by placing 100 parts of dried gel particles prepared as described in Example 4 in the sigma mixer. 54 parts deionized water were then slowly added onto the dried particles, while the latter was being mixed. The resulting 65% solids, gelled dispersion was extruded and then further processed as described in Example 33.

Example 33 and 34 abrasive grain were each screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Examples 33 and 34 coated abrasive discs were 110% and 107%, respectively, of the control discs.

Examples 35 and 36

Examples 35 and 36 were prepared as described in Example 31, except that for Example 36 the gelled dispersion was extruded through thirty six 0.32 cm (1/8 inch) circular openings. The density of Example 35 and 36 sintered abrasive grain was 3.933 g/cm$^3$ and 3.934 g/cm$^3$, respectively, g/cm$^3$, which was about 97.9% and 97.9%, respectively, of the theoretical density.

Example 35 and 36 abrasive grain were each screened to provide equal parts by weight of screen cuts −25+30 mesh and −30+35 mesh screen cuts. Screened abrasive grain was incorporated into coated abrasive discs, and evaluated as described in Example 2. The total cut (an average of four discs) of the Example 35 and 36 coated abrasive discs were 123% and 121%, respectively, of the control discs.

Example 37

1000 grams of the acid stabilized boehmite were mixed with 10 grams the graphite flakes (see Example 19) in the Warring blender. 544 grams of deionized water were sprayed (as described in Example 17) onto the boehmite/graphite flakes, while the latter tumbled in the pail mixer. The resulting 65% solids, gelled dispersion was extruded through one 0.63 cm (¼ inch) circular opening using the ram extruder as described in Example 32. The rods were further processed as described in Example 6.

Example 37 abrasive grain was screened to provide equal parts by weight of screen cuts −25+30 mesh and −30+35 mesh screen cuts. Screened abrasive grain was incorporated into coated abrasive discs, and evaluated as described in Example 2. The total cut (an average of five discs) of the Example 37 coated abrasive discs was 98% of the control discs, and 135% of another set of control discs made using equal parts by weight of screen cuts −25+30 mesh and −30+35 mesh screen cuts of fused alumina-zirconia abrasive grain (commercially available from Norton Co., under the trade designation "NZX").

Examples 38 and 39

Example 38 was prepared by spraying (as described in Example 17) a solution of 6 parts nitric acid and 48 parts deionized water onto 100 parts of boehmite ("DISPERAL"), while the latter tumbled in the pail mixer. The resulting gelled dispersion was extruded through one 0.63 cm (¼ inch) circular opening as described in Example 37 and then further processed as described in Example 6.

Example 39 was prepared by spraying (as described in Example 17) 48 parts deionized water onto 100 parts of dried gel particles (prepared as described in Example 4), while the latter was mixing in the pail mixer. The resulting 65% solids, gelled dispersion was further processed as described in Example 38.

Example 38 and 39 abrasive grain was each screened to provide equal parts by weight of screen cuts −25+30 mesh and −30+35 mesh screen cuts. Screened abrasive grain was incorporated into coated abrasive discs, and evaluated as described in Example 2 except twelve 1018 mild steel workpieces were ground for 12 one minute intervals for the 12 minute test. The total cut (an average of four discs) of the Example 38 and 39 coated abrasive discs was 122% and 130%, respectively, of the control discs.

Example 40

Example 40 was prepared by combining 100 parts of dried gel particles (prepared as described in Example 4), with 72.4 parts of tap water in the mixer described in Example 8 ("SCHUGI FLEX-O-MIX"). The resulting 58% solids, agglomerated gel material was extruded with a catalyst extruder (from Bonnot Co.) through thirty six 0.5 cm (³⁄₁₆ inch) circular openings. The rods were further processed as described in Example 6, except the dried material was crushed with the pulverizer. The density of the sintered abrasive grain was 3.93 g/cm$^3$, which was about 97.8% of the theoretical density; the Vickers hardness 18.9 GPa.

Example 40 abrasive grain were each screened to provide equal parts by weight of screen cuts −25+30 mesh and −30+35 mesh screen cuts. Screened abrasive grain was incorporated into coated abrasive discs, and evaluated as described in Example 2, except a set of discs were also ground 1018 mild steel workpieces as described for Examples 38 and 39. The total cut (an average of four discs) of the Example 40 coated abrasive discs was 113% of the control discs on the stainless workpieces, and 104% of the control discs on the mild steel workpieces. Another set of coated abrasive discs were prepared and evaluated as described in Examples 4 and 5, except the screened cuts used were equal parts by weight of −25+30 mesh and −30+35 mesh. The total cut (an average of four discs) of the latter discs was 100% of the control discs.

Example 41

Example 41 was prepared by spraying (as described in Example 17) acidified water (prepared by mixing 60 parts nitric acid and 478 parts deionized water) onto 1000 parts boehmite ("DISPERAL"), while the latter tumbled in the pail mixer. The resulting 65% solids, gelled dispersion was further processed as described in Example 40. The density of the sintered abrasive grain was 3.93 g/cm$^3$, which was about 97.8% of the theoretical density; the Vickers hardness 18.6 GPa.

Example 41 abrasive grain was screened to provide equal parts by weight of screen cuts −25+30 mesh and −30+35 mesh screen cuts. Screened abrasive grain was incorporated into coated abrasive discs, and evaluated as described in Example 2, except a set of discs were also ground 1018 mild steel workpieces as described for Examples 38 and 39. The total cut (an average of four discs) of the Example 41 coated abrasive discs was 128% of the control discs on the stainless workpieces, and 95% of the control discs on the mild steel workpieces. Another set of coated abrasive discs were made using equal parts by weight of screen cuts −25+30 mesh and −30+35 mesh screen cuts, and evaluated as described in Examples 4 and 5. The total cut (an average of four discs) of the latter discs was 112% of the control discs.

Example 42

Example 42 was prepared as described in Example 41 except 432 grams water were used to provide a 67% solids, gelled dispersion. The density of the sintered abrasive grain was 3.93 g/cm$^3$, which was about 97.8% of the theoretical density; the Vickers hardness 18.3 GPa.

Example 42 abrasive grain was screened to provide equal parts by weight of screen cuts −25+30 mesh and −30+35 mesh screen cuts. Screened abrasive grain was incorporated into coated abrasive discs, and evaluated as described in Example 2, except a set of discs were also ground 1018 mild steel workpieces as described for Examples 38 and 39. The total cut (an average of three discs) of the Example 42 coated abrasive discs was 126% of the control discs on the stainless workpieces, and 89% of the control discs on the mild steel workpieces. Another set of coated abrasive discs were made using equal parts by weight of screen cuts −25+30 mesh and −30+35 mesh screen cuts, and evaluated as described in Examples 4 and 5. The total cut (an average of four discs) of the latter discs was 103% of the control discs.

Example 43

Example 43 illustrate the preparation of abrasive grain molded into a pyramid shape. 1000 grams of boehmite ("DISPERAL") were placed in the pail mixer. 496.9 grams of acidified water (prepared by mixing 442 grams of deionized water with 54.9 grams of nitric acid) were sprayed (as described in Example 17) onto the boehmite, the latter tumbled in the pail mixer.

The resulting agglomerated material was extruded in the ram extruder (see Example 14 through one 0.64 cm (0.25 inch) circular opening. The extruded rod was passed through rubber rolls to form a flattened, approximately 0.1 mm thick ribbon. The ribbon was forced into cavities of a polymeric tooling hand rolling with a 2.5 cm (1 inch) diameter steel roll. The cavities were four-sided pyramids (excluding the base). approximately 535 micrometers deep; each base was approximately 1060 micrometers (on each side). The polypropylene tooling had been cast from a nickel plate metal master tool (see U.S. Pat. No. 5,435,816 (Spurgeon et al.), the disclosure of which is incorporated herein by reference).

The gel filled sheet was dried at 60 C for 1 hour in a conventional forced air oven. The dried material were removed from sheeting by tapping on its back side. The dried particles were calcined by placing them in a box furnace, heating to 700° C. over a one hour period, and them holding them at 700 C for 20 minutes. The calcined particles were impregnated with the rare earth nitrate solution as described in Example 1. The impregnated particles were dried at 60 C for one hour, placed in the box furnace, heating to 700° C. over a one hour period, held at 700 C for 20 minutes. The resulting calcined particles were again placed in the box furnace at room temperature, heated to 1400° C. over a 1.5 hour period, and then held at 1400° C. for 20 minutes.

Examples 44 and 45 and Illustrative Examples B and C

A gel was prepared by mixing 27.3 kg (60 pounds) of boehmite ("DISPERAL") and a mixture of 12 kg (26.6 pounds) distilled water and 1.6 kg (3.6 pounds) of concentrated nitric acid (70%) in a mixer (model FM-130D; available from Littleford-Day, Inc. of Florence, Ky.). After about 5 minutes of mixing the resulting gel was discharged from the mixer into plastic bags.

Example 44 was prepared by extruding a portion of the gel through a catalyst extruder (see Example 31) having a die having thirty-six 0.25 cm (1/10 inch) diameter holes. The extruded rods were dried at 80° C. for 3 hours, crushed on a Bico Braun pulverizer, calcined, impregnated with rare earth nitrate solution, again calcined, and sintered as described in Example 6, except the sintering temperature was 1406° C. The abrasive grain passed the Red Dye Test (i.e., it did not exhibit the red color after the Red Dye Test was completed). The density, as measured with the helium pycnometer, was 3.919 g/cm$^3$ (97.7% of theoretical density). The bulk density of a −14+30 mesh screen cut was 1.93 g/cm$^3$.

Example 5 was prepared as described in Example 4 except that the gel was not extruded. The abrasive grain passed the Red Dye Test. The density, as measured with the helium pycnometer, was 3.866 g/cm$^3$ (96.4% of theoretical density). The bulk density was 1.92 g/cm$^3$.

Illustrative Example B was prepared as described in Example 4 except that the gel was not impregnated. The abrasive grain did not pass the Red Dye Test. The density, as measured by the helium pycnometer was 3.535 g/cm$^3$ (88.8% of theoretical density). The bulk density was 1.55 g/cm$^3$.

Illustrative Example C was prepared as described in Example 4 except that the gel was neither extruded nor impregnated. The abrasive grain did not pass the Red Dye Test. The density, as measured by the helium pycnometer was 3.517 g/cm$^3$ (88.4% of theoretical density). The bulk density was 1.56 g/cm$^3$.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making alpha alumina-based ceramic abrasive grain, said method comprising the steps of:
   (a) preparing a dispersion by combining components comprising a first liquid medium, a peptizing agent, and greater than 60 percent by weight boehmite, based on the total weight of said dispersion, said boehmite being present in an amount sufficient to provide, on an oxide basis, said dispersion with greater than 99.9 percent by weight Al$_2$O$_3$, based on the total metal oxide content of said dispersion:
   (b) converting said dispersion to alpha alumina-based ceramic precursor material, wherein step (b) includes extruding said dispersion through a segmented screw extruder, and wherein extruding includes compacting said dispersion;
   (c) impregnating the precursor material with a composition comprising a mixture comprising a second liquid medium and at least one of a metal oxide or precursor thereof; and
   (d) converting the impregnated precursor material to alpha alumina-based ceramic abrasive grain having a density of greater than 90 percent of theoretical.

2. The method according to claim 1 wherein said first and second liquid mediums are water, and said peptizing agent is at least one acid.

3. The method according to claim 2 wherein said boehmite is present in an amount sufficient to provide, on a metal oxide basis, said dispersion with greater than 99.95 percent by weight Al$_2$O$_3$, based on the total metal oxide content of said dispersion.

4. The method according to claim 3 wherein step (b) further includes the steps of (i) drying said dispersion and (ii) calcining the dried dispersion.

5. The method according to claim 4, said abrasive grain having a density greater than 92 percent of theoretical.

6. The method according to claim 5 wherein said abrasive grain has a density greater than 97 percent of theoretical.

7. The method according to claim 5 wherein said composition impregnated into said precursor material is sufficient to provide, on a metal oxide basis, greater than 0.1 percent metal oxide, based on the total oxide content of said abrasive grain.

8. The method according to claim 7 wherein in step (a), the amount of boehmite is in the range from greater than 60% to about 65% by weight, based on the total weight of said dispersion.

9. The method according to claim 7 wherein the metal oxide precursor is at least one precursor of an oxide selected from the group consisting of magnesium oxide, cobalt oxide, nickel oxide, iron oxide, cerium oxide, zirconium oxide, hafnium oxide, lithium oxide, manganese oxide, chromium oxide, yttrium oxide, praseodymium oxide, samarium oxide, ytterbium oxide, neodymium oxide, lanthanum oxide, gadolinium oxide, dysprosium oxide, erbium oxide, europium oxide, titanium oxide, and zinc oxide.

10. The method according to claim 7 wherein the metal oxide precursor is selected from the group consisting of magnesium nitrate, cobalt nitrate, nickel nitrate, iron nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, zinc nitrate, zirconium nitrate, zirconyl acetate, magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, magnesium citrate, cobalt citrate, lithium citrate, manganese citrate, magnesium formate, cobalt formate, lithium formate, manganese formate, and nickel formate, or combinations thereof.

11. The method according to claim 7 wherein said abrasive grain are rods.

12. The method according to claim 7 further comprising the step of molding said dispersion into pyramids such that said abrasive grain are pyramids.

13. The method according to claim 5 wherein said composition impregnated into said precursor material is sufficient to provide, on a metal oxide basis, greater than 0.5 percent metal oxide, based on the total oxide content of said abrasive grain.

14. The method according to claim 13 wherein the metal oxide precursor is selected from the group consisting of magnesium nitrate, cobalt nitrate, nickel nitrate, iron nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, zinc nitrate, zirconium nitrate, zirconyl acetate, magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, magnesium citrate, cobalt citrate, lithium citrate, manganese citrate, magnesium formate, cobalt formate, lithium formate, manganese formate, and nickel formate, or combinations thereof.

15. The method according to claim 5 wherein said composition impregnated into said precursor material is sufficient to provide, on a metal oxide basis, greater than 2 percent metal oxide, based on the total oxide content of said abrasive grain.

16. The method according to claim 15 wherein the metal oxide precursor is selected from the group consisting of magnesium nitrate, cobalt nitrate, nickel nitrate, iron nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, zinc nitrate, zirconium nitrate, zirconyl acetate, magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, magnesium citrate, cobalt citrate, lithium citrate, manganese citrate, magnesium formate, cobalt formate, lithium formate, manganese formate, and nickel formate, or combinations thereof.

17. The method according to claim 1 wherein said first an second liquid mediums are aqueous, and wherein, in step (a), the amount of boehmite is in the range from about 63% to about 65% by weight, based on the total weight of said dispersion.

18. The method according to claim 1 wherein said boehmite is present in an amount sufficient to provide, on a metal oxide basis, said dispersion with greater than 99.95 percent by weight $Al_2O_3$, based on the total metal oxide content of said dispersion.

19. A method for making alpha alumina-based ceramic abrasive grain, said method comprising the steps of:
   (a) preparing a dispersion by combining components comprising water, a peptizing agent, and greater than 60 percent by weight boehmite, based on the total weight of said dispersion, said boehmite being present in an amount sufficient to provide, on an oxide basis, said dispersion with greater than 99.95 percent by weight $Al_2O_3$, based on the total metal oxide content of said dispersion, said dispersion containing, on a metal oxide basis, less than 0.05 percent by weight of nucleating material, based on the total metal oxide content of said dispersion, and said peptizing agent being at least one acid;
   (b) converting said dispersion to alpha alumina-based ceramic precursor material, wherein step (b) includes (i) extruding said dispersion through a segmented screw extruder, and wherein extruding includes compacting said dispersion, (ii) drying said dispersion, and (iii) calcining the dried dispersion;
   (c) impregnating the precursor material with a composition comprising a mixture comprising water and at least one of a metal oxide or precursor thereof; and
   (d) converting the impregnated precursor material to alpha alumina-based ceramic abrasive grain having a density of greater than 92 percent of theoretical,
wherein said composition impregnated into said precursor material is sufficient to provide, on a metal oxide basis, greater than 0.1 percent metal oxide, based on the total metal oxide content of said abrasive grain.

20. A method for making alpha alumina-based ceramic abrasive grain, said method comprising the steps of:
   (a) preparing a dispersion by combining components comprising water, a peptizing agent, and greater than 60 percent by weight boehmite, based on the total weight of said dispersion, said boehmite being present in an amount sufficient to provide, on an oxide basis, said dispersion with greater than 99.95 percent by weight $Al_2O_3$, based on the total metal oxide content of said dispersion, said dispersion containing, on a metal oxide basis, less than 0.05 percent by weight nucleating agent, based on the total metal oxide content of said dispersion, and said peptizing agent being at least one acid;
   (b) converting said dispersion to alpha alumina-based ceramic precursor material, wherein step (b) includes (i) extruding said dispersion through a segmented screw extruder, and wherein extruding includes compacting said dispersion, (ii) drying said dispersion, and (iii) calcining the dried dispersion;
   (c) impregnating the precursor material with a composition comprising a mixture comprising water and at least one of a metal oxide or precursor thereof; and
   (d) converting the impregnated precursor material to alpha alumina-based ceramic abrasive grain having a density of greater than 92 percent of theoretical,
wherein said composition impregnated into said precursor material is sufficient to provide, on a metal oxide basis, greater than 0.1 percent metal oxide, based on the total metal oxide content of said abrasive grain.

21. A method for making alpha alumina-based ceramic abrasive grain, said method comprising the steps of:
   (a) preparing a dispersion by combining components comprising water, a peptizing agent, and greater than 60 percent by weight boehmite, based on the total weight of said dispersion, said boehmite being present in an amount sufficient to provide, on an oxide basis, said dispersion with greater than 99.95 percent by weight $Al_2O_3$, based on the total metal oxide content of said dispersion, said dispersion containing, on a metal oxide basis, less than 0.05 percent by weight alpha alumina seeds, based on the total metal oxide content of said dispersion, and said peptizing agent being at least one acid;

(b) converting said dispersion to alpha alumina-based ceramic precursor material, wherein step (b) includes (i) extruding said dispersion through a segmented screw extruder, and wherein extruding includes compacting said dispersion, (ii) drying said dispersion, and (iii) calcining the dried dispersion;

(c) impregnating the precursor material with a composition comprising a mixture comprising water and at least one of a metal oxide or precursor thereof; and (d) converting the impregnated precursor material to alpha alumina-based ceramic abrasive grain having a density of greater than 92 percent of theoretical, wherein said composition impregnated into said precursor material is sufficient to provide, on a metal oxide basis, greater than 0.1 percent metal oxide, based on the total metal oxide content of said abrasive grain.

22. A method for making alpha alumina-based ceramic abrasive grain, said method comprising the steps of:

(a) preparing a first dispersion by combining components comprising liquid medium, acid, and boehmite;

(b) drying the first dispersion to provide first alpha alumina-based precursor material;

(c) combining components comprising water and said first alpha alumina-based precursor material to provide a second dispersion comprising water, an acid, and greater than 60 percent by weight boehmite, based on the total weight of said dispersion, said boehmite being present in an amount sufficient to provide, on an oxide basis, said dispersion with greater than 99.95 percent by weight $Al_2O_3$, based on the total metal oxide content of said dispersion.

(d) converting said second dispersion to second alpha alumina-based ceramic precursor material, wherein step (d) includes (i) extruding said dispersion through a segmented screw extruder, and wherein extruding includes compacting said dispersion, (ii) doing said second dispersion, and (iii) calcining the dried dispersion;

(e) impregnating the second precursor material with a composition comprising a mixture comprising water and at least one of a metal oxide or precursor thereof; and (f) converting the impregnated precursor material to alpha alumina-based ceramic abrasive grain having a density of greater than 92 percent of theoretical, wherein said composition impregnated into said precursor material is sufficient to provide, on a metal oxide basis, greater than 0.1 percent metal oxide, based on the total metal oxide content of said abrasive grain.

23. A method for making alpha alumina-based ceramic abrasive grain, said method comprising the steps of:

(a) preparing a first dispersion by combining components comprising liquid medium, acid, and boehmite;

(b) drying the first dispersion to provide first alpha alumina-based precursor material;

(c) combining components comprising water, boehmite, and said first alpha alumina-based precursor material to provide a second dispersion comprising water, an acid, and greater than 60 percent by weight boehmite, based on the total weight of said dispersion, said boehmite being present in an amount sufficient to provide, on an oxide basis, said dispersion with greater than 99.95 percent by weight $Al_2O_3$, based on the total metal oxide content of said dispersion;

(d) converting said second dispersion to second alpha alumina-based ceramic precursor material, wherein step (d) includes (i) extruding said dispersion through a segmented screw extruder, and wherein extruding includes compacting said dispersion, (ii) drying said second dispersion, and (iii) calcining the dried dispersion;

(e) impregnating the second precursor material with a composition comprising a mixture comprising water and at least one of a metal oxide or precursor thereof; and (f) converting the impregnated precursor material to alpha alumina-based ceramic abrasive grain having a density of greater than 92 percent of theoretical, wherein said composition impregnated into said precursor material is sufficient to provide, on a metal oxide basis, greater than 0.1 percent metal oxide, based on the total metal oxide content of said abrasive grain.

24. A method for making alpha alumina-based ceramic abrasive grain, said method comprising the steps of:

(a) preparing a dispersion by combining components comprising a first liquid medium, a peptizing agent, and greater than 60 percent by weight boehmite, based on the total weight of said dispersion, said boehmite being present in an amount sufficient to provide, on an oxide basis, said dispersion with greater than 99.9 percent by weight $Al_2O_3$, based on the total metal oxide content of said dispersion;

(b) converting said dispersion to alpha alumina-based ceramic precursor material, wherein step (b) includes extruding said dispersion through a segmented screw extruder, and wherein extruding includes compacting said dispersion;

(c) impregnating the precursor material with a composition comprising a mixture comprising a second liquid medium and at least one acidic metal oxide salt;

(d) impregnating at least a portion of the impregnated precursor material from step (c) with a second composition comprising a mixture comprising a third liquid medium and at least one basic salt; and (e) converting the impregnated precursor material from step (d) to alpha alumina-based ceramic abrasive grain having a density of greater than 90 percent of theoretical.

25. A method for making an abrasive article, said method comprising the steps of:

(a) preparing a dispersion by combining components comprising a first liquid medium, a peptizing agent, and greater than 60 percent by weight boehmite, based on the total weight of said dispersion, said boehmite being present in an amount sufficient to provide, on an oxide basis, said dispersion with greater than 99.9 percent by weight $Al_2O_3$, based on the total metal oxide content of said dispersion;

(b) converting said dispersion to alpha alumina-based ceramic precursor material, wherein step (b) includes extruding said dispersion through a segmented screw extruder, and wherein extruding includes compacting said dispersion;

(c) impregnating the precursor material with a composition comprising a mixture comprising a second liquid medium and at least one of a metal oxide or precursor thereof;

(d) converting the impregnated precursor material to alpha alumina-based ceramic abrasive grain having a density of greater than 90 percent of theoretical; and (e) combining at least a plurality of said alpha alumina-based ceramic abrasive grain with binder to provide an abrasive article.

26. The method according to claim 25 wherein said abrasive article is a coated abrasive article that includes a backing.

27. The method according to claim 26 wherein step (e) further includes combining fused alumina abrasive grain with said binder.

28. A method for making alpha alumina-based ceramic abrasive grain, said method comprising the steps of:
(a) preparing a dispersion by combining components comprising a first liquid medium, a peptizing agent, at least one of a first metal oxide or precursor thereof, and greater than 60 percent by weight boehmite, based on the total weight of said dispersion;
(b) converting said dispersion to alpha alumina-based ceramic precursor material, wherein step (b) includes extruding said dispersion through a segmented screw extruder, and wherein extruding includes compacting said dispersion;
(c) impregnating the precursor material with a composition comprising a mixture comprising a second liquid medium and at least one of a second metal oxide or precursor thereof; and
(d) converting the impregnated precursor material to alpha alumina-based ceramic abrasive grain having a density of greater than 90 percent of theoretical, wherein said at least one of a first metal oxide or precursor thereof and said at least one of a second metal oxide or precursor thereof are present in a sufficient amount to provide said abrasive grain with, on a metal oxide basis, at least 0.1 percent by weight metal oxide, based on the total metal oxide content of said abrasive grain.

29. The method according to claim 28 wherein said first and second liquid mediums are both water, and said peptizing agent is at least one acid.

30. The method according to claim 29 wherein said composition comprises a mixture comprising said second liquid medium and at least one second metal oxide precursor.

31. The method according to claim 29, said abrasive grain having a density greater than 92 percent of theoretical.

32. The method according to claim 31 wherein step (b) further includes the steps of (i) drying said dispersion and (ii) calcining the dried dispersion.

33. The method according to claim 32, said abrasive grain having a density greater than 97 percent of theoretical.

34. The method according to claim 32 wherein said composition impregnated into said precursor material is sufficient to provide, on a metal oxide basis, greater than 0.1 percent metal oxide, based on the total metal oxide content of said abrasive grain.

35. The method according to claim 34 wherein in step (a), the amount of boehmite is in the range from greater than 60% to about 65% by weight, based on the total weight of said dispersion.

36. The method according to claim 34 wherein the metal oxide precursor is at least one precursor of an oxide selected from the group consisting of magnesium oxide, cobalt oxide, nickel oxide, iron oxide, cerium oxide, zirconium oxide, hafnium oxide, lithium oxide, manganese oxide, chromium oxide, yttrium oxide, praseodymium oxide, samarium oxide, ytterbium oxide, neodymium oxide, lanthanum oxide, gadolinium oxide, dysprosium oxide, erbium oxide, europium oxide, titanium oxide, and zinc oxide.

37. The method according to claim 34 wherein the metal oxide precursor is selected from the group consisting of magnesium nitrate, cobalt nitrate, nickel nitrate, iron nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, zinc nitrate, zirconium nitrate, zirconyl acetate, magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, magnesium citrate, cobalt citrate, lithium citrate, manganese citrate, magnesium formate, cobalt formate, lithium formate, manganese formate, and nickel formate, or combinations thereof.

38. The method according to claim 34 further comprising the step of molding said dispersion into pyramids such that said abrasive grain are pyramids.

39. The method according to claim 32 wherein said composition impregnated into said precursor material is sufficient to provide, on a metal oxide basis, greater than 0.5 percent metal oxide, based on the total metal oxide content of said abrasive grain.

40. The method according to claim 39 wherein the second metal oxide precursor is selected from the group consisting of magnesium nitrate, cobalt nitrate, nickel nitrate, iron nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, zinc nitrate, zirconium nitrate, zirconyl acetate, magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, magnesium citrate, cobalt citrate, lithium citrate, manganese citrate, magnesium formate, cobalt formate, lithium formate, manganese formate, and nickel formate, or combinations thereof.

41. The method according to claim 32 wherein said composition impregnated into said precursor material is sufficient to provide, on a metal oxide basis, greater than 2 percent metal oxide, based on the total metal oxide content of said abrasive grain.

42. The method according to claim 41 wherein the second metal oxide precursor is selected from the group consisting of magnesium nitrate, cobalt nitrate, nickel nitrate, iron nitrate, lithium nitrate, manganese nitrate, chromium nitrate, yttrium nitrate, samarium nitrate, neodymium nitrate, lanthanum nitrate, gadolinium nitrate, dysprosium nitrate, europium nitrate, zinc nitrate, zirconium nitrate, zirconyl acetate, magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, magnesium citrate, cobalt citrate, lithium citrate, manganese citrate, magnesium formate, cobalt formate, lithium formate, manganese formate, and nickel formate, or combinations thereof.

43. The method according to claim 32 wherein the abrasive grain material comprises, on a metal oxide basis, at least 0.5 percent by weight of oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, and ZnO, based on the total metal oxide content of said abrasive grain.

44. The method according to claim 32 wherein said abrasive grain comprises, on a metal oxide basis, at least about 2 percent by weight of oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, $SnO_2$, and ZnO, based on the total metal oxide content of said abrasive grain.

45. The method according to claim 32 wherein said dispersion includes at least one precursor of an oxide selected from the group consisting of magnesium oxide, cobalt oxide, nickel oxide, iron oxide, cerium oxide, zirconium oxide, hafnium oxide, lithium oxide, manganese oxide, chromium oxide, yttrium oxide, praseodymium oxide, samarium oxide, ytterbium oxide, neodymium oxide, lanthanum oxide, gadolinium oxide, dysprosium oxide, erbium oxide, europium oxide, titanium oxide, and zinc oxide.

46. The method according to claim 32 wherein said dispersion comprises, on a metal oxide basis, less than 0.1 percent metal oxide other than that provided by said boehmite, based on the total metal oxide content of said dispersion.

47. The method according to claim 32 wherein said dispersion comprises, on a metal oxide basis, less than 0.05 percent metal oxide other than that provided by said boehmite, based on the total metal oxide content of said dispersion.

48. The method according to claim 32 wherein said at least one of a first metal oxide or precursor thereof and said at least one of a second metal oxide or precursor thereof are present in a sufficient amount to provide said abrasive grain with, on a metal oxide basis, at least 0.5 percent by weight metal oxide, based on the total metal oxide content of said abrasive grain.

49. The method according to claim 32 wherein said at least one of a first metal oxide or precursor thereof and said at least one of a second metal oxide or precursor thereof are present in a sufficient amount to provide said abrasive grain with, on a metal oxide basis, at least 2 percent by weight metal oxide, based on the total metal oxide content of said abrasive grain.

50. The method according to claim 32 wherein said first and second metal oxides are the same.

51. A method for making alpha alumina-based ceramic abrasive grain, said method comprising the steps of:
(a) preparing a dispersion by combining components comprising water, a peptizing agent, at least one of a first metal oxide or precursor thereof, and greater than 60 percent by weight boehmite, based on the total weight of said dispersion, said dispersion containing, on a metal oxide basis, less than 0.05 percent by weight of nucleating material, based on the total metal oxide content of said dispersion, and said peptizing agent being at least one acid;
(b) converting said dispersion to alpha alumina-based ceramic precursor material, wherein step (b) includes (i) extruding said dispersion through a segmented screw extruder, and wherein extruding includes compacting said dispersion, (ii) drying said dispersion, and (iii) calcining the dried dispersion;
(c) impregnating the precursor material with a composition comprising a mixture comprising water and at least one of a second metal oxide or precursor thereof; and
(d) converting the impregnated precursor material to alpha alumina-based ceramic abrasive grain having a density of greater than 92 percent of theoretical, wherein said second metal oxide or precursor thereof is present in a sufficient amount to provide said abrasive grain with, on a metal oxide basis, at least 0.1 percent by weight metal oxide, based on the total metal oxide content of said abrasive grain.

52. A method for making alpha alumina-based ceramic abrasive grain said method comprising the steps of:
(a) preparing a dispersion by combining components comprising water, a peptizing agent, at least one of a first metal oxide or precursor thereof, and greater than 60 percent by weight boehmite, based on the total weight of said dispersion, said dispersion containing, on a metal oxide basis, less than 0.05 percent by weight nucleating agent, based on the total metal oxide content of said dispersion, and said peptizing agent being at least one acid;
(b) converting said dispersion to alpha alumina-based ceramic precursor material, wherein step (b) includes (i) extruding said dispersion through a segmented screw extruder, and wherein extruding includes compacting said dispersion, (ii) drying said dispersion, and (iii) calcining the dried dispersion;
(c) impregnating the precursor material with a composition comprising a mixture comprising water and at least one of a second metal oxide or precursor thereof; and
(d) converting the impregnated precursor material to alpha alumina-based ceramic abrasive grain having a density of greater than 92 percent of theoretical, wherein said second metal oxide or precursor thereof is present in a sufficient amount to provide said abrasive grain with, on a metal oxide basis, at least 0.1 percent by weight metal oxide, based on the total metal oxide content of said abrasive grain.

53. A method for making alpha alumina-based ceramic abrasive grain, said method comprising the steps of:
(a) preparing a dispersion by combining components comprising water, a peptizing agent, at least one of a first metal oxide or precursor thereof, and greater than 60 percent by weight boehmite, based on the total weight of said dispersion, said dispersion containing, on a metal oxide basis, less than 0.05 percent by weight alpha alumina seeds, based on the total metal oxide content of said dispersion, and said peptizing agent being at least one acid;
(b) converting said dispersion to alpha alumina-based ceramic precursor material, wherein step (b) includes (i) extruding said dispersion through a segmented screw extruder, and wherein extruding includes compacting said dispersion, (ii) drying said dispersion, and (iii) calcining the dried dispersion;
(c) impregnating the precursor material with a composition comprising a mixture comprising water and at least one of a second metal oxide or precursor thereof; and
(d) converting the impregnated precursor material to alpha alumina-based ceramic abrasive grain having a density of greater than 92 percent of theoretical, wherein said second metal oxide or precursor thereof is present in a sufficient amount to provide said abrasive grain with, on a metal oxide basis, at least 0.1 percent by weight metal oxide, based on the total metal oxide content of said abrasive grain.

54. A method for making alpha alumina-based ceramic abrasive grain, said method comprising the steps of:

(a) providing a first dispersion by combining components comprising liquid medium, acid, and boehmite;

(b) drying said first dispersion to provide first alpha alumina-based precursor material;

(c) combining components comprising water and said first alpha alumina-based precursor material to provide a second dispersion comprising water, an acid, at least one of a first metal oxide or precursor thereof, and greater than 60 percent by weight boehmite, based on the total weight of said dispersion;

(d) converting said second dispersion to second alpha alumina-based ceramic precursor material, wherein step (d) includes (i) extruding said dispersion through a segmented screw extruder and wherein extruding includes compacting said dispersion, (ii) drying said dispersion, and (iii) calcining the dried dispersion;

(e) impregnating said second precursor material with a composition comprising a mixture comprising a second liquid medium and at least one of a second metal oxide or precursor thereof; and (f) converting the impregnated precursor material to alpha alumina-based ceramic abrasive grain having a density of greater than 92 percent of theoretical, wherein said least one of a second metal oxide or precursor thereof is present in a sufficient amount to provide said abrasive grain with, on a metal oxide basis, at least 0.1 percent by weight metal oxide, based on the total metal oxide content of said abrasive grain.

55. A method for making alpha alumina-based ceramic abrasive grain, said method comprising the steps of:

(a) preparing a first dispersion by combining components comprising liquid medium, acid, and boehmite;

(b) drying said first dispersion to provide first alpha alumina-based precursor material;

(c) combining components comprising water, boehmite, and said first alpha alumina-based precursor material to provide a second dispersion comprising water, an acid, at least one of a first metal oxide or precursor thereof, and greater than 60 percent by weight boehmite, based on the total weight of said dispersion;

(d) converting said second dispersion to second alpha alumina-based ceramic precursor material, wherein step (d) includes (i) extruding said dispersion through a segmented screw extruder, and wherein extruding includes compacting said dispersion, (ii) drying said second dispersion, and (iii) calcining the dried dispersion, (e) impregnating said second precursor material with a composition comprising a mixture comprising a second liquid medium and at least one of a second metal oxide or precursor thereof; and (f) converting the impregnated precursor material to alpha alumina-based ceramic abrasive grain having a density of greater than 92 percent of theoretical, wherein said least one of a second metal oxide or precursor thereof is present in a sufficient amount to provide said abrasive grain with, on a metal oxide basis, at least 0.1 percent by weight metal oxide, based on the total metal oxide content of said abrasive grain.

56. The method according to claim 55 wherein said abrasive grain are rods.

57. A method for making alpha alumina-based ceramic abrasive grain, said method comprising the steps of:

(a) preparing a dispersion by combining components comprising a first liquid medium, a peptizing agent, at least one of a first metal oxide or precursor thereof, and greater than 60 percent by weight boehmite, based on the total weight of said dispersion;

(b) converting said dispersion to alpha alumina-based ceramic precursor material, wherein step (b) includes extruding said dispersion through a segmented screw extruder, and wherein extruding includes compacting said dispersion;

(c) impregnating the precursor material with a composition comprising a mixture comprising a second liquid medium and at least one acidic metal oxide salt;

(d) impregnating at least a portion of the impregnated precursor material from step (c) with a second composition comprising a mixture comprising a third liquid medium and at least one basic salt;

(e) converting the impregnated precursor material from step (d) to alpha alumina-based ceramic abrasive grain having a density of greater than 90 percent of theoretical, wherein said at least one of a first metal oxide or precursor thereof, said at least one acidic salt, and said at least one basic salt are present in a sufficient amount to provide said abrasive grain with, on a metal oxide basis, at least 0.1 percent by weight metal oxide, based on the total metal oxide content of said abrasive grain.

58. A method for making an abrasive article, said method comprising the steps of:

(a) preparing a dispersion by combining components comprising a first liquid medium, a peptizing agent, at least one of a first metal oxide or precursor thereof, and greater than 60 percent by weight boehmite, based on the total weight of said dispersion;

(b) converting said dispersion to alpha alumina-based ceramic precursor, material, wherein step (b) includes extruding said dispersion through a segmented screw extruder, and wherein extruding includes compacting said dispersion;

(c) impregnating the precursor material with a composition comprising a mixture comprising a second liquid medium and at least one of a second metal oxide or precursor thereof;

(d) converting the impregnated precursor material to alpha alumina-based ceramic abrasive grain having a density of greater than 90 percent of theoretical; and (e) combining at least a plurality of said alpha alumina-based ceramic abrasive grain with binder to provide an abrasive article, wherein said at least one of a first metal oxide or precursor thereof and said at least one of a second metal oxide or precursor thereof are present in a sufficient amount to provide said abrasive grain with, on a metal oxide basis, at least 0.1 percent by weight metal oxide, based on the total metal oxide content of said abrasive grain.

59. The method according to claim 58 wherein said abrasive article is a coated abrasive article that includes a backing.

60. The method according to claim 59 wherein step (e) further includes combining fused alumina abrasive grain with said binder.

* * * * *

UNITED STATES PATENT AND TRADEMARK OFFICE
CERTIFICATE OF CORRECTION

PATENT NO. : 5,908,478
DATED : June 1, 1999
INVENTOR(S) : Wood, William P.

It is certified that error appears in the above-identified patent and that said Letters Patent is hereby corrected as shown below:

Column 24,
Line 47, delete "in described".

Column 28,
Line 2, delete "nitrate))" and insert in place thereof -- nitrate) --.

Column 29,
Line 35, delete "to" following "onto" and preceding "the".

Column 33,
Line 15, insert -- of -- following "grams" and before "the".

Column 37,
Line 61, delete "an" and insert in place thereof -- and --.

Column 39,
Line 47, delete "doing" and insert in place thereof -- drying --.

Column 45,
Line 27, insert -- at -- following "said" and preceding "least" in last paragraph.
Line 59, insert -- at -- following "said" and preceding "least" in last paragraph.

UNITED STATES PATENT AND TRADEMARK OFFICE
CERTIFICATE OF CORRECTION

PATENT NO.   : 5,908,478
DATED        : June 1, 1999
INVENTOR(S)  : Wood, William P.

It is certified that error appears in the above-identified patent and that said Letters Patent is hereby corrected as shown below:

Column 46,
Line 50, delete "(d)", second occurrence, and insert in place thereof -- (e) --.

Signed and Sealed this

Ninth Day of July, 2002

Attest:

JAMES E. ROGAN
Attesting Officer        Director of the United States Patent and Trademark Office